United States Patent
Karlov et al.

(10) Patent No.: US 10,371,784 B2
(45) Date of Patent: Aug. 6, 2019

(54) SYSTEM AND METHOD FOR MULTI-SENSOR MULTI-TARGET 3D FUSION USING AN UNBIASED MEASUREMENT SPACE

(71) Applicant: RAYTHEON COMPANY, Waltham, MA (US)

(72) Inventors: Valeri I. Karlov, Stony Brook, NY (US); Julian S. Brody, Southampton, NY (US); John D. Hulsmann, Miller Place, NY (US)

(73) Assignee: RAYTHEON COMPANY, Waltham, MA (US)

( * ) Notice: Subject to any disclaimer, the term of this patent is extended or adjusted under 35 U.S.C. 154(b) by 180 days.

(21) Appl. No.: 15/172,578

(22) Filed: Jun. 3, 2016

(65) Prior Publication Data

US 2017/0350956 A1 Dec. 7, 2017

(51) Int. Cl.
*G01C 3/08* (2006.01)
*G01S 5/16* (2006.01)
(Continued)

(52) U.S. Cl.
CPC .......... *G01S 3/7867* (2013.01); *G01B 11/002* (2013.01); *G01C 3/08* (2013.01); *G01S 3/785* (2013.01); *G01S 5/16* (2013.01)

(58) Field of Classification Search
CPC .................................................. G01S 3/7867
See application file for complete search history.

(56) References Cited

U.S. PATENT DOCUMENTS

| 4,954,837 A | * | 9/1990 | Baird ................. G01C 21/005 342/458 |
| 5,379,044 A | | 1/1995 | Carlson et al. |

(Continued)

FOREIGN PATENT DOCUMENTS

CA  2 323 882 A1  9/1999

OTHER PUBLICATIONS

Bourgeois, F. et al.; "An Extension of the Munkres Algorithm for the Assignment Problem to Rectangular Matrices"; Communications of the ACM; vol. 14; No. 12; Dec. 1971; pp. 802-804.
(Continued)

*Primary Examiner* — John E Breene
*Assistant Examiner* — Raymond L Nimox
(74) *Attorney, Agent, or Firm* — Lewis Roca Rothgerber Christie LLP

(57) ABSTRACT

System and method for determining a position of a target in an unbiased 3D measurement space: generating 2D measurement data in focal planes of each sensor; calculating a line of sight (LOS) from the target for each sensor; intersecting the LOSs and finding the closest intersection point in a 3D space; calculating a boresight LOS in 3D for each sensor; intersecting the boresight lines of sights for each sensor, and finding the closest intersection point in the 3D space to define an origin for forming the unbiased 3D measurement space; and forming local unbiased 3D estimates of the position of the target in the unbiased 3D measurement space as a difference between a closest point of the target LOS and a closest point of the boresight LOS.

15 Claims, 17 Drawing Sheets

(9 of 17 Drawing Sheet(s) Filed in Color)

(51) Int. Cl.
  *G01B 11/00* (2006.01)
  *G01S 3/785* (2006.01)
  *G01S 3/786* (2006.01)

(56) References Cited

U.S. PATENT DOCUMENTS

| | | | |
|---|---|---|---|
| 5,526,001 A * | 6/1996 | Rose | G01S 1/026 |
| | | | 342/442 |
| 5,798,942 A | 8/1998 | Danchick et al. | |
| 5,852,792 A * | 12/1998 | Nielson | B64G 1/24 |
| | | | 244/164 |
| 5,960,097 A * | 9/1999 | Pfeiffer | G06K 9/3241 |
| | | | 342/357.59 |
| 7,551,121 B1 | 6/2009 | O'Connell et al. | |
| 7,941,292 B2 | 5/2011 | Kusner et al. | |
| 7,974,814 B2 | 7/2011 | Phelps et al. | |
| 8,437,972 B2 | 5/2013 | Ploplys et al. | |
| 8,799,189 B2 | 8/2014 | Schwoegler et al. | |
| 9,019,350 B2 | 4/2015 | Richards | |
| 9,612,316 B1 * | 4/2017 | Griesmeyer | G01S 5/0294 |
| 2005/0060092 A1 * | 3/2005 | Hablani | B64G 1/24 |
| | | | 701/472 |
| 2012/0257050 A1 * | 10/2012 | Simon | G01S 5/163 |
| | | | 348/135 |
| 2017/0131096 A1 * | 5/2017 | Karlov | G01C 1/10 |

OTHER PUBLICATIONS

Poore, Aubrey B. et al.; "Some Assignment problems arising from multiple target tracking"; Mathematical and Computer Modelling; 43; 2006; pp. 1074-1091.

* cited by examiner

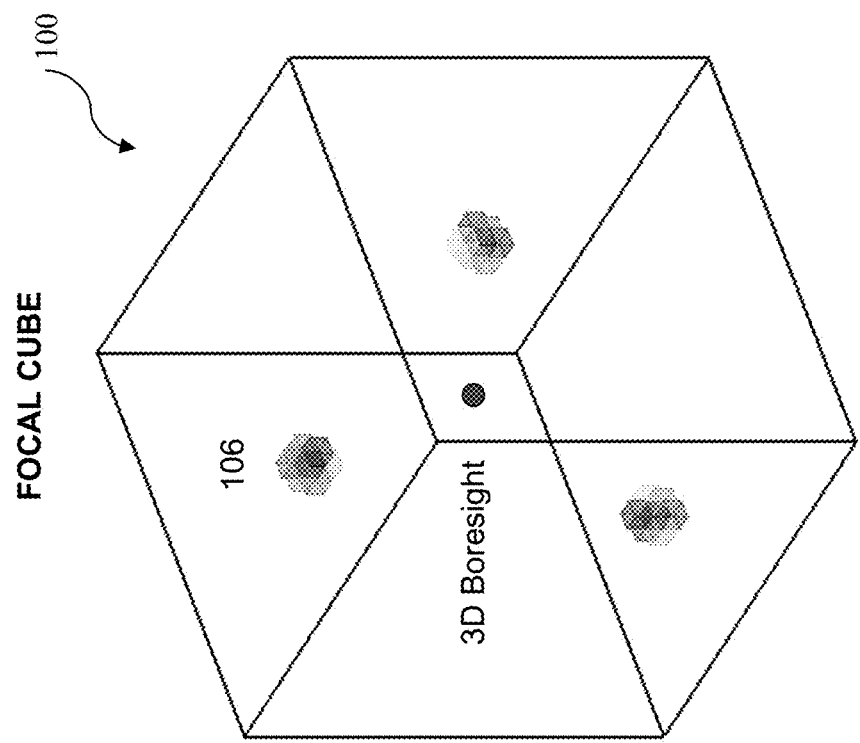
FIG. 1
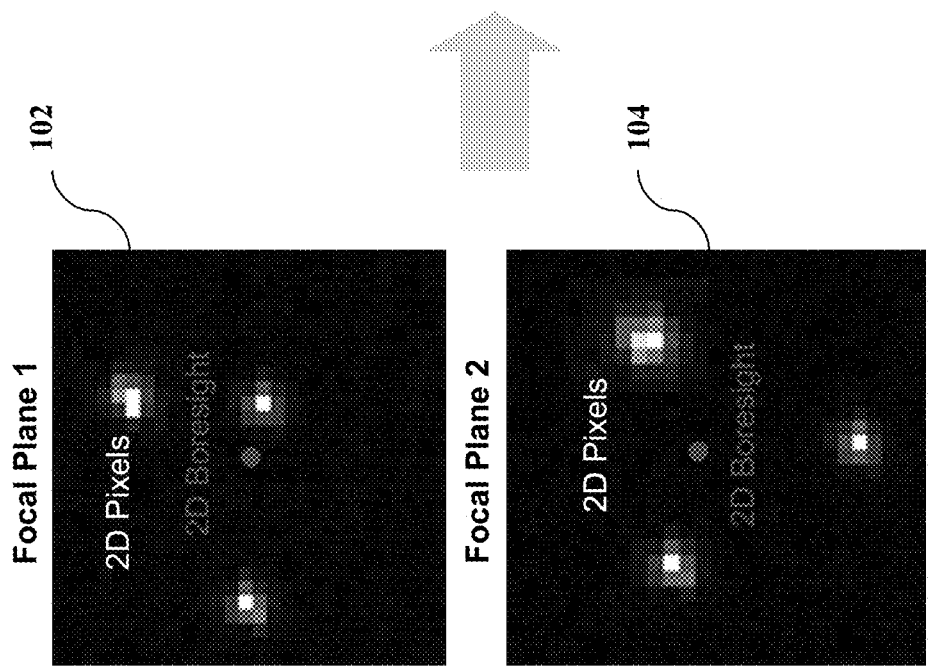

Differential Azimuth/Elevation Space

Differential Range Space

Two-Spot Pattern in FOCAL CUBE

SYSTEM AND METHOD FOR MULTI-SENSOR MULTI-TARGET 3D FUSION USING AN UNBIASED MEASUREMENT SPACE

FIELD OF THE INVENTION

The disclosed invention relates generally to electro-optical/infrared (EO/IR) sensor systems and, more particularly, to a system and method of multi-sensor multi-target 3D fusion using an unbiased 3D measurement space.

BACKGROUND

The main obstacle for accurate 3D tracking is the presence of the sensors' line of sight (LOS) biases which are usually ~10× or up to 100× (depending on application) larger than the measurement errors in the sensors' focal planes (FPs). Some common LOS biases are caused by the sensor installation on the platform, misalignments between FP and the inertial measurement unit (IMU) including misalignments between focal planes of multi-band sensors; by uncertainties in positions of the sensors; by atmospheric refraction effects (including multi-band dependencies); and by time synchronization errors between multiple sensors. These LOS bias errors are hard to characterize statistically (unlike random measurement noise) and therefore the robustness of the estimation process is decreased when a lack of knowledge of the statistics of the bias errors exists. To reduce the LOS biases, current solutions include star calibration, which uses the angular star measurements for each sensor to estimate its absolute LOS via the Stellar-Inertial LOS estimation algorithm. But, in general, the inclusion of LOS biases (even reduced via the star calibration) in the 3D tracking processes results in decreased performance of the tracker, for example Multiple-Hypotheses Tracking (MHT) algorithm (in terms of error covariances for the state-vector and probabilities for multiple hypotheses).

The problem of multi-sensor, multi-target 3D fusion has been of practical interest for some time. Typical approaches are based on the two major stages: target/feature association; and target/feature tracking in 3D. "Target" is defined herein as an object already confirmed to be a target and can be subsequently tracked. "Feature" is defined as any object (e.g., clutter) which is considered to be a candidate for being declared to be a target and thus needs to be associated and tracked across the sensors to confirms that it is in fact a real target or not. Hereinafter, "target" as used refers to a target, a feature or both. At the target association stage, the closest approach (triangulation) is used to intersect the line of sight (LOS) from each of two (or more) sensors to the potential target and generate the best associations of 2D tracks in order to estimate the initial 3D positions of the targets as viewed by the multiple sensors. There are various data association algorithms, such as the Munkres algorithm, which is based on the efficient handling of target-pair combinatorics. This approach mitigates the LOS biases via global optimization in the azimuth/elevation space or miss distance between the LOS At the tracking stage a powerful MHT framework is often used for tracking multiple targets over time and continuing associations of tracks from multiple sensors. At this stage, the measurement models are usually linearized and an Extended Kalman-type Filter (EKF) as a part of the MHT framework is used for each target to estimate an extended state vector, which includes the targets' positions and velocities as well as LOS biases (modelled by first- or higher-order Markov shaping filters). However, Kalman-type filtering is a computationally expensive and complex process when the number of targets is large and therefore a large covariance matrix is needed for the state-vector of each target and the common biases vector.

Typically, the effect of LOS biases is more severe for narrow/medium field-of-view (FOV) sensors (e.g., FOV <10°), when the goal is to fully utilize the high-resolution of the pixel. This is the typical case for the modern electro-optical or infrared (EO/IR) remote sensors. In any case, it is highly desirable to isolate LOS biases, because, unlike measurement noise, they are difficult to characterize (correlated in time) and are unpredictable. Any mismatch in their statistical modeling can result into divergent 3D estimates.

Accordingly, there is a need for a more efficient, more flexible, less computationally complex and higher quality approach to multi-sensor, multi-target 3D fusion for an EO/IR sensor system.

SUMMARY

In some embodiments, the disclosed invention is a method for determining a position of a target in an unbiased three dimensional (3D) measurement space using sensor data collected against the target. The method comprises: generating two dimensional (2D) measurement data for the target in focal planes of each of a plurality of sensors; calculating a line of sight (LOS) to the target for each of the plurality of sensors; intersecting the calculated lines of sight for each of the plurality of sensor and finding the closest intersection point in a 3D space; calculating a boresight line of sight in 3D for each of the plurality of sensors; intersecting the boresight lines of sights for each of the plurality of sensors, and finding the closest intersection point in the 3D space to define an origin for forming the unbiased 3D measurement space; and forming local unbiased 3D estimates of the position of the target in the unbiased 3D measurement space as a difference between a closest point of the target LOS and a loosest point of the boresight LOS.

In some embodiments, the disclosed invention is a system for determining a position of a target in an unbiased 3D measurement space using three dimensional (3D) fusion of sensor data collected against the target comprising: a plurality of sensors, each for generating two dimensional (2D) measurement data for the target in one or more focal planes of said each sensor; a first processor for calculating a line of sight (LOS) from the target for each of the plurality of sensors; and a second processor for intersecting the calculated line of sight for each of the plurality of sensor and finding a closest intersection point in a 3D space in a 3D space, calculating a boresight line of sight in 3D for each of the plurality of sensors, intersection the boresight line of sights for each of the plurality of sensors and finding the closest intersection point, in the 3D space to define an origin for forming the unbiased 3D measurement space, and forming local unbiased 3D estimates of the position of the target in the unbiased 3D measurement space as a difference between a closest point of the target and a closest point of the boresight. The first processor and the second processor may be the same processor. Alternatively, the first processor may be located at proximity of at least one of the plurality of sensors, and the second processor may be located in a ground platform, an air platform or a sea platform. In some embodiments, a third processor may utilize the local unbiased 3D estimates of the position of the target to perform one or more of tracking the target, recognizing the target, and characterizing the target.

In some embodiments, where there are a plurality of target candidate pairs, the plurality of target candidate pairs may be associated by analyzing each of target candidate pairs to determine whether a target candidate pair constitutes a target, generating differential azimuth/elevation values for each target candidate pair via a projection of the closest points for target candidate pairs and boresight LOSs back into the focal planes of each target candidate pair, generating a differential range for each target candidate pair via differencing the ranges to the closest points of said each target candidate pair and to the closest point of the boresight LOSs of said each target candidate pair, transforming the differential azimuth/elevation values and the ranges into the unbiased 3D measurement space, and searching for two locations in the unbiased 3D measurement space for associating the target candidate pairs, wherein the size of the locations is defined by a sensor resolution in the unbiased 3D measurement space.

BRIEF DESCRIPTION OF THE DRAWINGS

The patent or application file contains at least one drawing executed in color. Copies of this patent or patent application publication with color drawing(s) will be provided by the Office upon request and payment of necessary fee. These and other features, aspects, and advantages of the disclosed invention will become better understood with regard to the following description, appended claims, and accompanying drawings.

FIG. 1 is an exemplary depiction of a FOCAL CUBE in relation to two (or more) 2D focal planes, according to some embodiments of the disclosed invention.

DETAILED DESCRIPTION

Figure 2A:
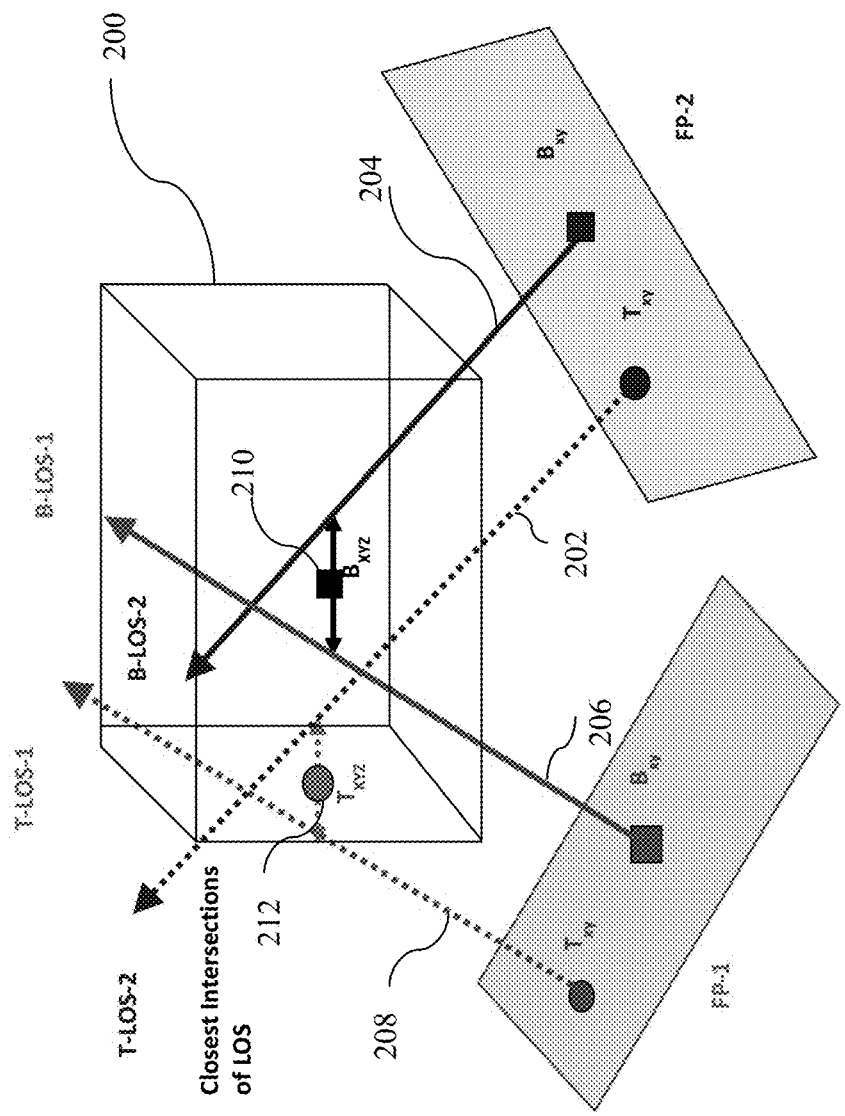
FIG. 2A is an exemplary schematic illustration of the generation of a FOCAL CUBE from two (or more) 2D focal planes, according to some embodiments of the disclosed invention.

In some embodiments, the disclosed invention isolates the LOS biases from the target association and tracking steps of a 3D target tracking process. More particularly, a Focal-plane Overlay via Closest Approach in Local Cube Unscented from Bias Errors (hereinafter referred to as FOCAL CUBE) solution sorts out the track associations and estimates the relative arrangement of targets in a 3D space with virtually no bias errors. In some embodiments, the estimated target trajectories may still remain shifted in absolute space by the LOS bias errors that is translated into the absolute coordinate system (ECI). The LOS bias errors can be estimated via the known methods, such as, stellar-inertial LOS estimation method, which uses star calibration to estimate the LOS biases for each sensor and projects them into the 3D boresight bias of the FOCAL CUBE, or other calibration methods including range measurements from LADAR. This way, the problem of multi-sensor 3D fusion is solved in a new highly-effective way by developing an unbiased 3D measurement space (virtual 3D sensor) synthesized from two or more 2D EO/IR sensors. The disclosed invention solves the problem of 3D fusion by calculating a 3D virtual sensor (with FOCAL CUBE as an unbiased 3D measurement space), rather than applying sophisticated math to jointly estimate target positions and LOS biases, as the conventional approaches do. The calculated FOCAL CUBE can then be used to characterize the target(s), for example, track the targets(s) and/or recognize them.

FIG. 1 is an exemplary depiction of a FOCAL CUBE in relation to two (or more) 2D focal planes, according to some embodiments of the disclosed invention. In these embodiments, the FOCAL CUBE 100 of the disclosed invention is an upgrade of two (or more) 2D focal planes 102 and 104 by a third dimension. As shown, the 3D FOCAL CUBE 100 has its origin "3D Boresight" similar to the two depicted 2D FPs 102 and 104 that have their origins as "2D boresights." Also, the FOCAL CUBE 100 has 3D voxels 106 as measurement units, which are similar to 2D pixels as measurement units in a FP. If targets are observed in 2D in the depicted two FPs 102 and 104, they can similarly be observed in the 3D FOCAL CUBE 100 with an equivalent 3D resolution and without any effect of LOS biases. In a 2D FP, one observes 2D apparent events, but in 3D FOCAL CUBE one observes 3D real events (which can be modeled by the laws of physics) since the observation is in 3D.

The FOCAL CUBE of the disclosed invention provides a new capability of operating in an unbiased measurement space to solve problems of target association, 3D target tracking, target characterization and the like at the pixel (voxel) level of accuracy. This approach provides the unbiased estimates of multiple targets in the local FOCAL CUBE instantaneously and with pixel-level accuracy, without any loss due to LOS biases. Moreover, the unbiased multiple-target local estimates in FOCAL CUBE can be effectively used as additional measurements for facilitating fast estimation of LOS biases and thus 3D boresight position of the FOCAL CUBE so that positions of targets in the absolute space can be easily determined, in addition to stellar or other calibrations.

The new approach of the disclosed invention addresses one or more of the following challenging applications where it is difficult to meet requirements due to biases by providing a new de-centralized, non-Kalman-filter solution:

Longer stand-off ranges (smaller diversity in hinge angles)

Low elevation angles which result into large atmospheric refraction effects

Treatment of biases (due to FP misalignments, wavelength-dependent refraction) in multi-band systems and, thus, placing scenes observed in multiple bands into the same 3D (no multiple-band registration is needed)

Characterization of complex events in cluttered environments with closely-spaced multiple objects (like stage separation or deployment of lethal objects and decoys)

Massive raids with multiple clusters of multiple targets (resource allocation challenge)

Fusion from platforms with multiple phenomenology (EO/IR, LADAR, RADAR, etc.). The new approach simply provides preprocessed multiple targets in FOCAL CUBE (unbiased measurement space) for higher-level fusion (Decentralized Fusion without any losses).

Figure 2B:
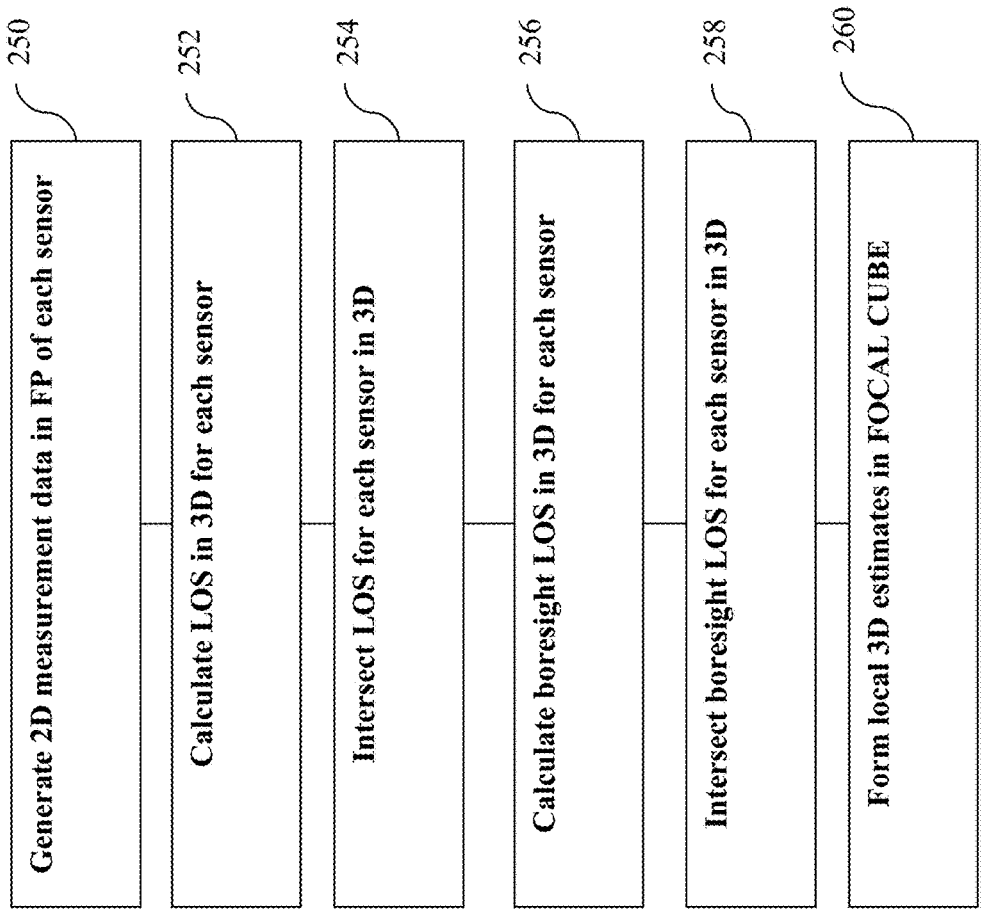
FIG. 2B illustrates an exemplary process flow for generation of a FOCAL CUBE from two (or more) 2D focal planes, according to some embodiments of the disclosed invention.

FIG. 2A is an exemplary schematic illustration of the generation of a FOCAL CUBE from two 2D focal planes, according to some embodiments of the disclosed invention. FIG. 2B illustrates an exemplary process flow for generation of a FOCAL CUBE from two (or more) 2D focal planes, according to some embodiments of the disclosed invention. In this example, there are two sensors pointing to a single target, each with a corresponding focal plane, FP-1 and FP-2. However, as described below, the disclosed invention is also applicable to multiple stationary or moving sensors and multiple stationary or moving targets. As shown, the measurement data (LOS) (202-208 in FIG. 2A) from a single target (which is later expanded to multiple targets) in two or more focal planes FP-1 and FP-2 located at different sensors is generated by respective ones of the two sensors (block 250 in FIG. 2B). The solid lines 204 and 206 depict the boresight measurement ($B_{xy}$) and the dotted lines 202 and 208 depict the target measurements from respective sensors ($T_{xy}$). The lines of sight (LOS) to the target for each sensor are then obtained (in block 252 of FIG. 2B), using, for example, known LOS reconstruction methods. The two or more target LOSs T-LOS-1 and T-LOS-2 and boresight LOSs B-LOS-1 and B-LOS-2 are then intersected so that the intersection point has the minimum sum of distances to each LOS, in block 254 of FIG. 2B. In this case, the closest intersection point is the triangulated estimate of the target in 3D (212 in FIG. 2A).

The boresight LOS in 3D for each sensor is then calculated, in block 256 of FIG. 2B. The boresight LOS in 3D for each sensor are then intersected, in block 258 of FIG. 2B. For example, as shown, the closest intersection point between the target LOSs T-LOS-1 and T-LOS-2 is $T_{xyz}$ (212 in FIG. 2A), and the closest intersection point between the boresight LOSs B-LOS-1 and B-LOS-2 is $B_{xyz}$ (210 in FIG. 2A) The corresponding minimum distances are shown as the vectors from the closest point to each line. In some embodiments, this is a classic known triangulation method, which some conventional methods use to initialize position of target in 3D.

The boresight LOS intersection yields the estimate of the boresight in 3D, which defines the origin $B_{xyz}$ 210 of FOCAL CUBE 200. The size of FOCAL CUBE in the absolute ECI coordinate system is defined by a scope to which the two or more FPs overlay. The size depends on the ranges from the sensors to the target which is simply a product of the range and target's angle between its LOS and boresight LOS (e.g., 208-206 for FP-1 and 204-202 for FP-2 in FIG. 2A). After the two closest points are constructed, the local estimate of the target position in 3D FOCAL CUBE is formed as the difference between the target closest point $T_{xyz}$ 212 and the boresight closest point $B_{xyz}$ 210, in block 260 of FIG. 2B. This estimate turns out to be unbiased from LOS biases as was proven mathematically, though Monte-Carlo simulations and processing real measured data from EO/IR sensors. That is, the relative position of the 3D estimate of target (the closest intersection point of the two or more target LOS) with respect to the origin of FOCAL CUBE (the closest intersection point of the two or more boresight LOS) is completely unscented from LOS biases.

In other words, the differential estimate is invariant to LOS biases. This includes all biases which are common for boresight LOS and target LOS. Such biases are typically due to various misalignments between FPs and inertial instruments, due to uncertainties in sensors locations, due to atmospheric refraction ray bending, due to time synchronization errors between two (or more) sensors, etc. Accordingly, the disclosed invention provides a new unbiased measurement space in 3D (FOCAL CUBE), similar to the FPs in 2D that provide the unbiased measurement space in 2D. In the case of FOCAL CUBE, 2D pixels (of a 2D FP) become 3D voxels and the 2D boresight becomes a 3D boresight. In both cases (focal plane and FOCAL CUBE), there are no biases in measuring target with respect to the focal plane or FOCAL CUBE origin (2D or 3D boresight). Rather, the biases are just isolated in the 2D and 3D boresights. The FOCAL CUBE according to some embodiments of the disclosed invention comprises of differencing only two triangulations, however, it results in a significantly desirable results, that is, local unbiased observations with respect to the center of the 3D FOCAL CUBE. For example, the conventional methods use complex Kalman-type filters to estimate both the target states and the LOS biases. This involves a large covariance matrix to establish the correlations of the state vectors for targets with common biases. The FOCAL CUBE of the disclosed invention eliminates the need for such large covariance matrix, since such biases are not present in the unbiased measurement space of the FOCAL CUBE.

The obtained FOCAL CUBE can then be used for a variety of applications, such as tracking targets, including multiple simultaneously moving targets, generating 3D models of targets in the FOCAL CUBE for target recognition and characterization. In general, FOCAL CUBE is a new fundamental solution to the effective use of multiple EO/IR sensors when the LOS biases are significantly larger than the pixel sizes. In this case, multiple EO/IR sensors are synthesized into a virtual 3D sensor with the unbiased measurement space. This makes it possible to use FOCAL CUBE in broader applications when combining EO/IR sensors with other sensors (radars, LADARs, SARs, etc.).

For example, modern EO/IR sensors for targeting are usually augmented by LADAR to measure a range to a single target and thus using the azimuth/elevation LOS angles and the range, determine location of the target in 3D. In the case of multiple targets, a LADAR should be repointed to each target to estimate its position in 3D. The FOCAL CUBE of the disclosed invention provides an unbiased measurement space (even using a single moving sensor over multiple times) in which all relative ranges of targets are measured with high (voxel) accuracy. Consequently, pointing the LADAR to only one target is sufficient to determine 3D positions of all other targets observed in FP(s). In other words, FOCAL CUBE augments the active sensors by the unbiased 3D measurement space for all targets, which makes possible to design highly effective hybrid passive/active systems (e.g., EO/IR and LADAR).

The process allows for a straightforward repetition over a large number of targets to construct an unbiased 3D measurement space for multiple targets one-by-one without considering any couplings between targets. For example, the above described approaches can be generalized for multiple targets, if the targets are associated between multiple sensors, i.e., when each sensor knows which target it is observing (e.g., based on the additional information such as radiometric signatures of targets). A more general case of unknown assignments is considered below. In the case of known assignments, the triangulation is simply applied for each group (two or more) of LOS associated with each target. Also, the triangulation is applied to the two (or more) boresights representing the center (zero) of each focal plane. As a result, the local estimates for each target in the FOCAL CUBE can be generated individually via differencing of the corresponding closest points. This decentralization is one of the advantages of the FOCAL CUBE over state-of the-art fusion techniques where the estimation of the target positions should be performed collectively (for all targets) by using a large covariance matrix for the extended state vector which includes the target state-vectors and the LOS biases.

Figure 3:
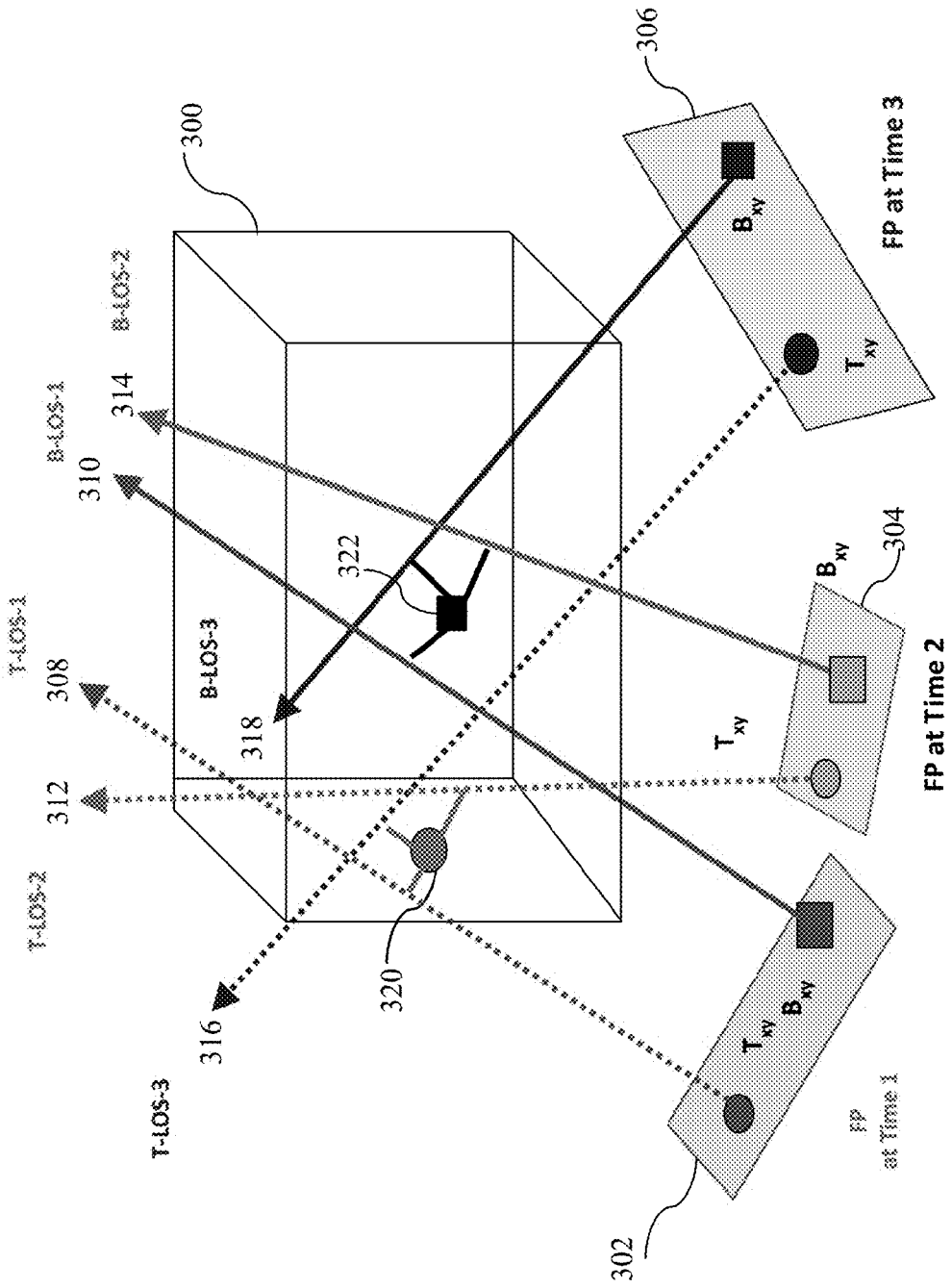
FIG. 3 shows an exemplary FOCAL CUBE for one sensor and one target at different times, according to some embodiments of the disclosed invention.

The above approach is also applicable to a single sensor on the moving platform when the sensor observes a stationary scene (stationary targets) at different points in time. FIG. 3 shows an exemplary FOCAL CUBE for one sensor and one target at different times (3 in all), according to some embodiments of the disclosed invention. Note that having observations of one sensor at different times (at different positions) is equivalent to having virtual multiple sensors or FPs (blocks 302, 304 and 306). In this case, as shown in FIG. 3, the closest approach needs to be performed twice (once for targets LOS and once for boresight LOS) for all times (i.e., Time 1, Time 2 and Time 3). The closest intersection point 320 for target is determined by intersecting the three target LOS (blocks 308, 312 and 316). The closest intersection point 322 for 3D boresight is determined by intersecting the three boresight LOS (blocks 310, 314 and 318). The next step is to construct the differential measurement for the target as the difference of the targets intersection points in 3D with the 3D boresight points (blocks 320 and 322, respectively). As a result, the local arrangement of multiple targets is estimated with the pixel accuracy in the 3D FOCAL CUBE (block 300).

Figure 4A:
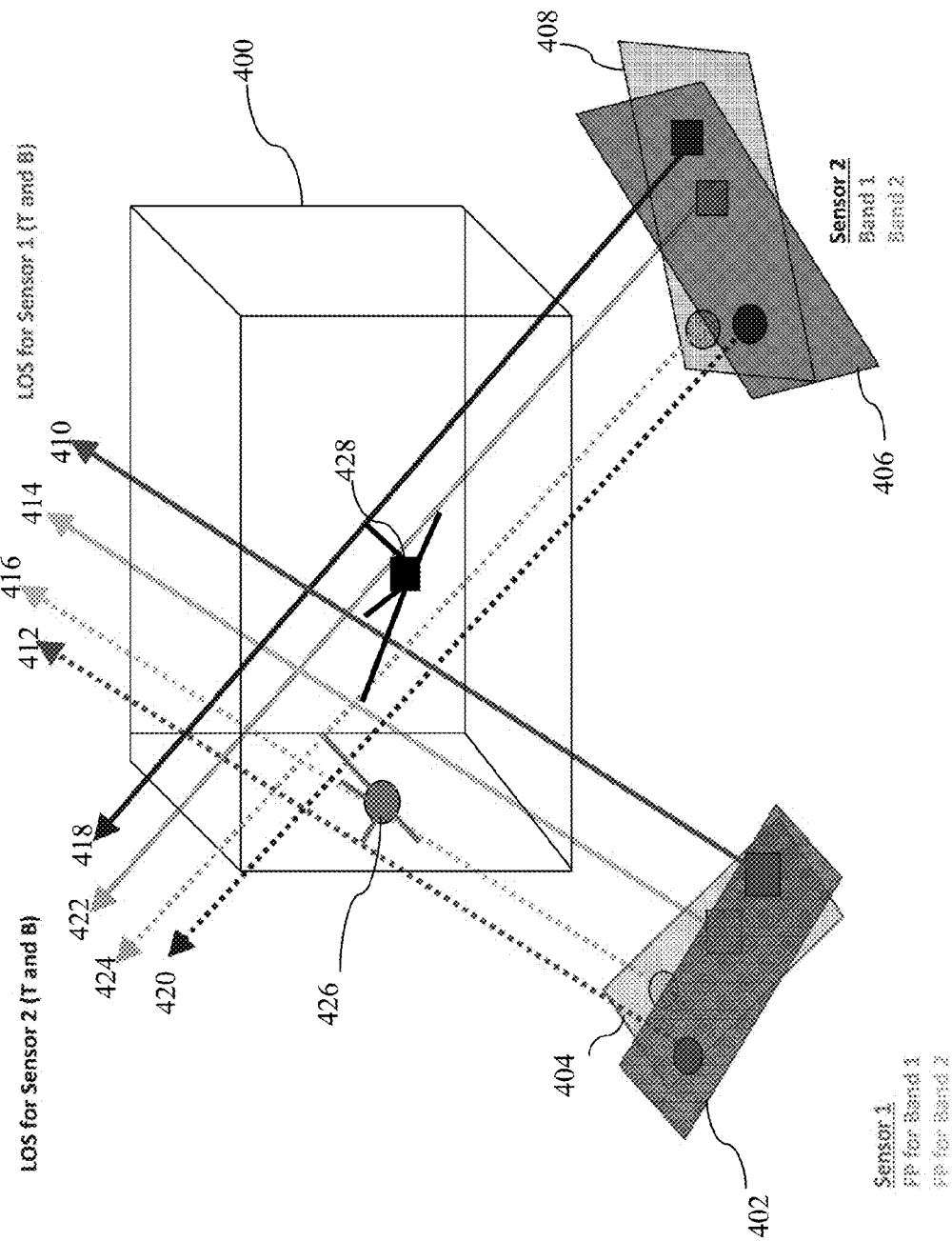
FIG. 4A shows an exemplary FOCAL CUBE for two sensors each including two bands, and one target, according to some embodiments of the disclosed invention.

Similarly, the above approach is applicable to the case when one or two sensors have multiple focal planes for multiple wavebands (for example, that depicted in FIG. 4A). The EO/IR sensors typically include visible, Short-Wave Infra-Red (SWIR), Mid-Wave Infra-Red (MWIR) and Long-Wave Infra-Red (LWIR) wavebands.

FIG. 4A shows an exemplary FOCAL CUBE for two sensors each including two bands, and one target, according to some embodiments of the disclosed invention. In this case, one needs to implement the closest approach twice (for targets LOS and for boresight LOS) for all multiple wavebands (multiple FPs) and construct the differential measurement as the difference of the targets intersection points in 3D with the 3D boresight points.

As a result, the local arrangement of multiple targets is estimated with the pixel accuracy in the 3D FOCAL CUBE. This approach brings the same scene observed in multiple wavebands into the same 3D space without any effects of LOS biases. In other words, the constructed FOCAL CUBE is invariant to various misalignments in multiple focal planes (visible, SWIR, MWIR, LWIR) and also invariant to waveband-dependent atmospheric refraction effects. This invariance to LOS biases in multiple bands is especially important for utilization of the full potential of the multiple-band EO/IR sensors since in this case, metric and radiometric characteristics of the scene are registered in 3D without any errors due to LOS biases.

Figure 4B:
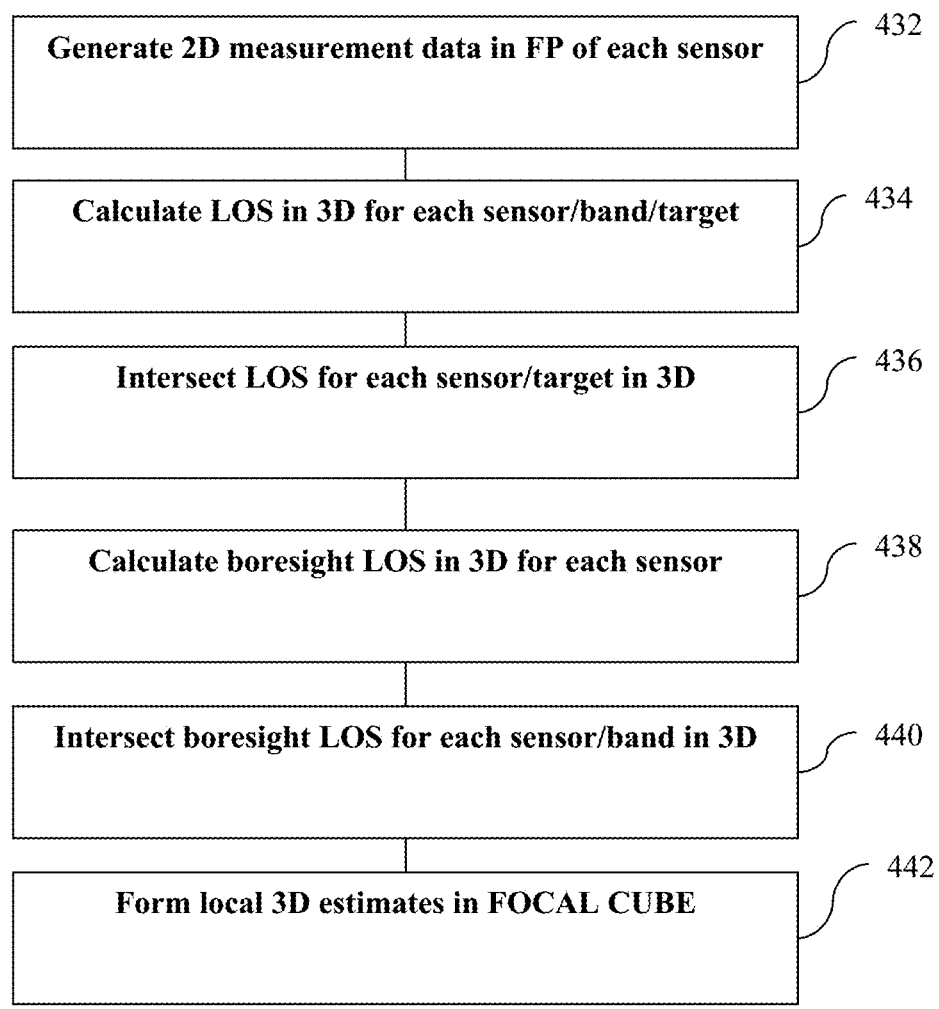
FIG. 4B depicts an exemplary process flow for generating a FOCAL CUBE for multiple targets, according to some embodiments of the disclosed invention.

FIG. 4B shows an exemplary process flow for generating a FOCAL CUBE for multiple targets, according to some embodiments of the disclosed invention. Only one target is depicted for simplicity, but, as was stated above, the process of generating a target point in 3D FOCAL CUBE is repeatable for each target (no inter-dependencies between targets). As shown in block 432, the measurement data (pixel positions of targets in FP) is generated by sensor 1 and sensor 2 from multiple targets in two or more focal planes (402-408) of different sensors. Each sensor has two bands and each band has a FP. For example, FP 402 is for band 1 of Sensor 1, FP 404 is for band 2 of Sensor 1, FP 406 is for band 1 of Sensor 2 and FP 408 is for band 2 of Sensor 2. In block 434, the absolute lines of sight (LOS) for multiple targets are calculated for each sensor from the pixel positions, correspondingly the LOS 412 and 416 are for Sensor 1 and the LOS 420 and 424 are for Sensor 2. In block 436, for each target, the two or more associated LOS are intersected 426, for example using the closest approach (triangulation), so that the intersection point 426 has the minimum sum of distances to each LOS. More particularly, FIG. 4A shows that the closest point 426 is a result of the closest intersection of the four LOS, namely 412/416 for Sensor 1 and 420/424 for Sensor 2. The closest intersection points individually generated for each target are the triangulated estimates of the targets in 3D.

The boresight LOS in the absolute space for each sensor is then calculated in block 438, assuming that the pixel position of boresight is zero in FP (in general, any pixel in FP can be declared as the boresight one). Correspondingly, Sensor 1 has the boresight LOS 410 for FP 402 (band 1) and the boresight LOS 414 for FP 404 (band 2); while Sensor 2 has the boresight LOS 418 for FP 406 (band 1) and the boresight LOS 422 for FP 408 (band 2). The boresight LOS for all sensors are then intersected 428, for example using the closest approach (e.g., triangulation), in block 440. The boresight LOS intersection is accomplished by the same algorithm as for each target (triangulation). This intersection 428 is the estimate of the boresight in 3D, which defines the origin of the FOCAL CUBE. In block 442, the local estimates of the targets positions in 3D FOCAL CUBE are calculated as the differences between the target/closest points 426 and the boresight closest point 428. These estimates are unbiased from LOS biases, as explained above.

In this case, the 3D FOCAL CUBE generated from all LOS (including ones for each waveband) is invariant to waveband misalignments in multiple focal planes and to waveband-dependent atmospheric refraction effects. This brings all radiometric information observed in multiple wavebands into the same 3D geometric space within the FOCAL CUBE without any need for further registration.

For the case of multiple targets, within the FOCAL CUBE, real 3D events are measured without any LOS biases, in contrast to apparent 2D events in a focal plane. If one can resolve the local arrangement of multiple targets in a 2D focal plane, one can resolve the local arrangement of multiple target in 3D FOCAL CUBE with an equivalent 3D resolution, using the above described approach. The errors due to LOS biases become isolated in the 3D boresight, which make it possible to decompose the problem of estimating the absolute positions of multiple targets in Earth Centered Inertial (ECI) system into two steps. First, estimate local positions of targets in FOCAL CUBE and second, find location of FOCAL CUBE in ECI via, for example, stellar-inertial LOS estimation or other calibration techniques e.g. based on Range Measurements from a radar, a LADAR or similar systems.

Figure 5A:
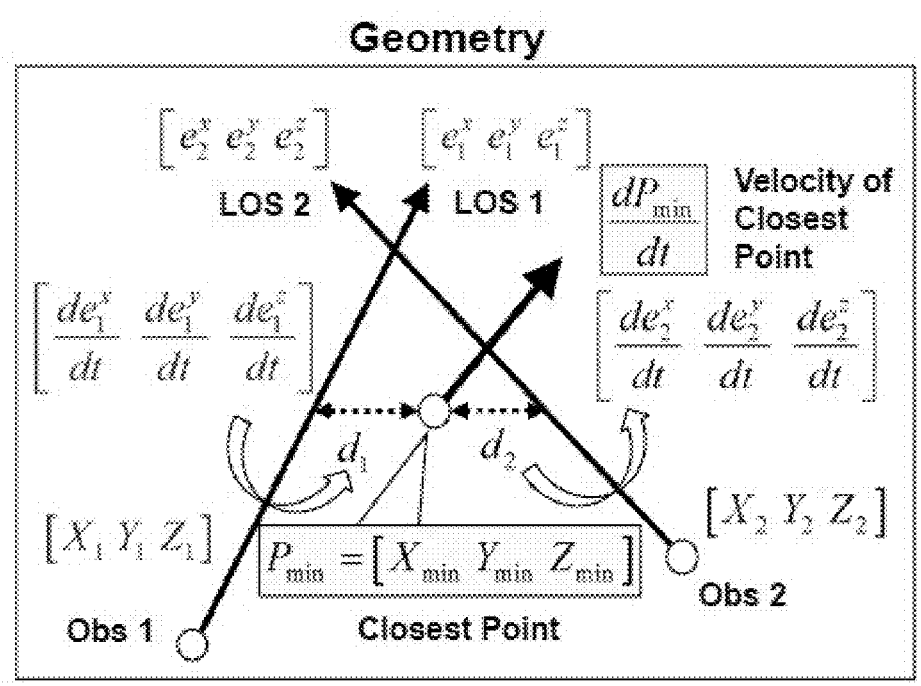
FIG. 5A shows an exemplary FOCAL CUBE for a generalized dynamic triangulation biases and their rates, according to some embodiments of the disclosed invention.
Figure 5B:
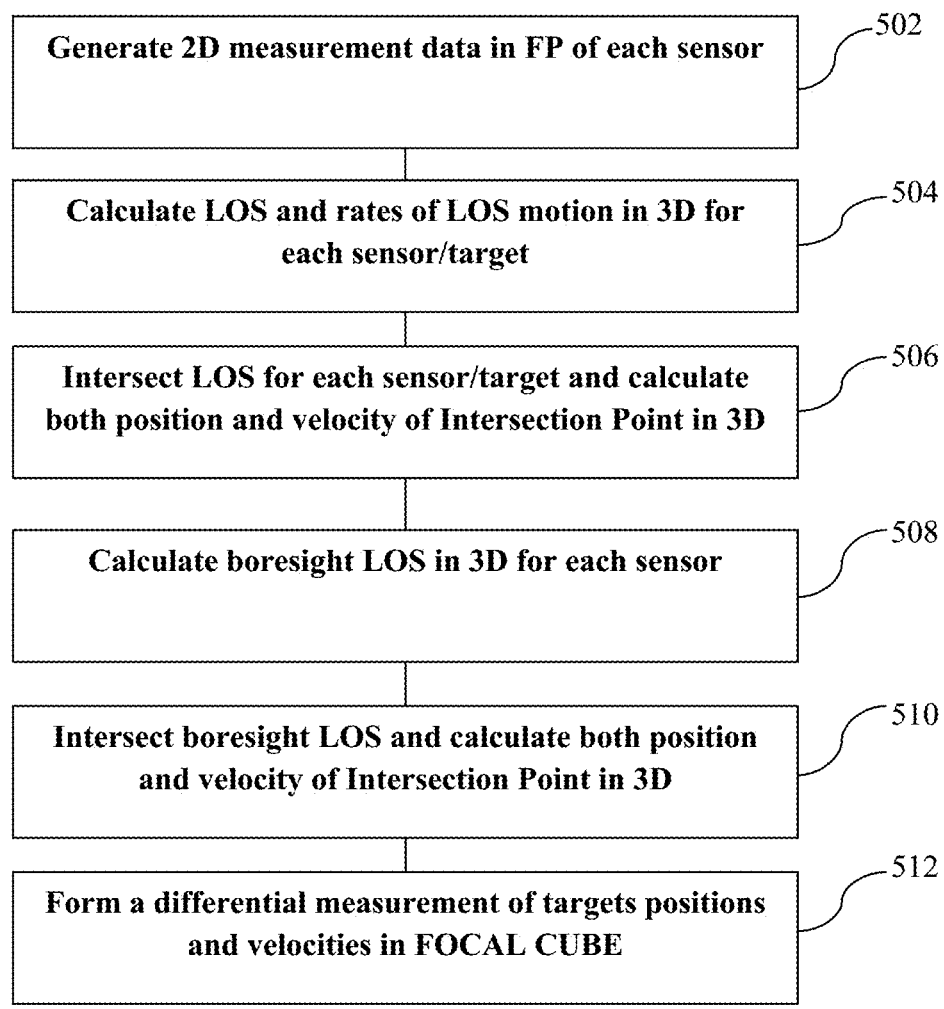
FIG. 5B is an exemplary process flow for a dynamic triangulation for treatment of LOS biases and their rates, according to some embodiments of the disclosed invention.

FIG. 5A shows a generalized dynamic triangulation for treatment of LOS biases and their rates. It should be noted that for simplicity, FIG. 5A illustrates both cases of LOS, that is, the LOS for target and the boresight LOS (zero-pixel or the origin of FP). FIG. 5B is an exemplary process flow for a dynamic triangulation for treatment of LOS biases and their rates, according to some embodiments of the disclosed invention. In these embodiments, the FOCAL CUBE is generalized for and applied to the case when angular rates are directly measured in focal planes, for example, by processing the IMU data (e.g., angular rate from gyros), the INS data (positions and attitude) via the known boresight LOS reconstruction algorithms for computing LOS angles (azimuth/elevation) and their rates. This dynamic triangulation approach for treatment of both LOS biases and their rates (LOS bias rates) provides the unbiased local estimates of not only the positions of targets in 3D but also, the unbiased local estimates of their velocities. The local velocity estimates unbiased from LOS bias rates are important for enabling accurate long-term predictions of moving multiple targets.

As shown in block 502 of FIG. 5B, the measurement data (both angular positions and angular rates) is generated for the multiple targets in two or more focal planes, located at different sensors/observers (Obs 1 and Obs 2). The LOS and the rates of LOS motion are calculated for multiple target for each sensor, in block 504. As shown in FIG. 5A, for Observer 1 the LOS 1 is represented by a unit vector $e_1$ (with the x, y, z components) and for Observer 2 the LOS 2 is represented by a unit vector $e_2$ (with the x, y, z components). The angular rates for each LOS are denoted as time-derivatives d( )/dt. As was described above, the known LOS reconstruction algorithms are used to transform the pixel data for targets to the absolute pointing vector (LOS). The angular rates of LOS are obtained via analytical differentiation of the LOS equations using the IMU data for angular rates.

In block 506 for each target, the two or more associated LOSs are intersected utilizing the generalized dynamic closest approach (e.g., a generalized dynamic triangulation as shown in FIG. 5A both for the target-LOS and boresight-LOS), so that the intersection point $P_{min}$ has the minimum sum of distances ($d_1$ and $d_2$) to each LOS. The closest intersection points for each target are the triangulated estimates of the targets positions and velocities in the three dimensional coordinate system.

In block 508, the boresight LOS (for zero-pixel point in FP) and the rate of LOS motion for each sensor are obtained from the metadata data (IMU gyro angular rates, INS positions and attitude, etc., which is processed via the known LOS reconstruction algorithm.

In block 510, the boresight LOSs for all sensors are intersected utilizing the closest approach (e.g., a generalized dynamic triangulation as shown in FIG. 5A both for the target-LOS and boresight-LOS). In some embodiments, the boresight LOS intersection is accomplished by the same process as for each target (e.g., generalized dynamic triangulation). This intersection is the position/velocity estimates of the boresight in 3D (point $P_{min}$) as shown in FIG. 5A. The point $P_{min}$ defines the origin of FOCAL CUBE and the vector $dP_{min}/dt$ defines its velocity.

An exemplary process of a generalized dynamic triangulation (shown in FIG. 5A and applicable both for the target-LOS and boresight-LOS) is described as following.

a. Compute the matrix S, [3×3]

$$S = \sum_{i=1}^{m} \begin{pmatrix} (e_i^x)^2 - 1 & e_i^x e_i^y & e_i^x e_i^z \\ e_i^x e_i^y & (e_i^y)^2 - 1 & e_i^y e_i^z \\ e_i^x e_i^z & e_i^y e_i^z & (e_i^z)^2 - 1 \end{pmatrix} \quad 1$$

b. Computer the vector C, [3×1]

$$c = \sum_{i=1}^{m} \begin{pmatrix} X_i((e_i^x)^2 - 1) + Y_i e_i^x e_i^y + Z_i e_i^x e_i^z \\ X_i e_i^x e_i^y + Y_i((e_i^y)^2 - 1) + Z_i e_i^y e_i^z \\ X_i e_i^x e_i^z + Y_i e_i^y e_i^z + Z_i((e_i^z)^2 - 1) \end{pmatrix} \quad 2$$

c. Compute the Closest Point by solving a linear system of 3 equations $$SP_{min} = c \quad 3$$

d. Compute time derivatives of the matrix S and the vector c (analytically)
e. Compute the velocity of the closest point by solving a linear system of 3 equations $$S\left(\frac{dP_{min}}{dt}\right) = -\left(\frac{dS}{dt}\right)P_{min} + \left(\frac{dc}{dt}\right) \quad 4$$

In equations 1 and 2, m is the number of sensors, $e_i$ is the [3×1] unit LOS vector with the x, y, z components in the ECI system for each i-th sensor. In the equation 2, $X_i$, $Y_i$, $Z_i$ are the Cartesian coordinates of each i-th sensor in the ECI system. In equations 3 and 4, $P_{min}$ is the closest intersection point of all LOS for m sensors. In equation 4, d( )/dt is the time derivative.

In block 512, a differential measurement of targets positions is formed as a difference of positions of targets closest points and positions of boresight closest point. Also, a differential measurement of targets velocities is formed as a difference of velocities of targets closest points and velocities of boresight closest point. As a result, the local arrangement of targets as well as their local velocities in the constructed FOCAL CUBE are estimated without any effects of LOS biases and their rates.

Figure 5C:
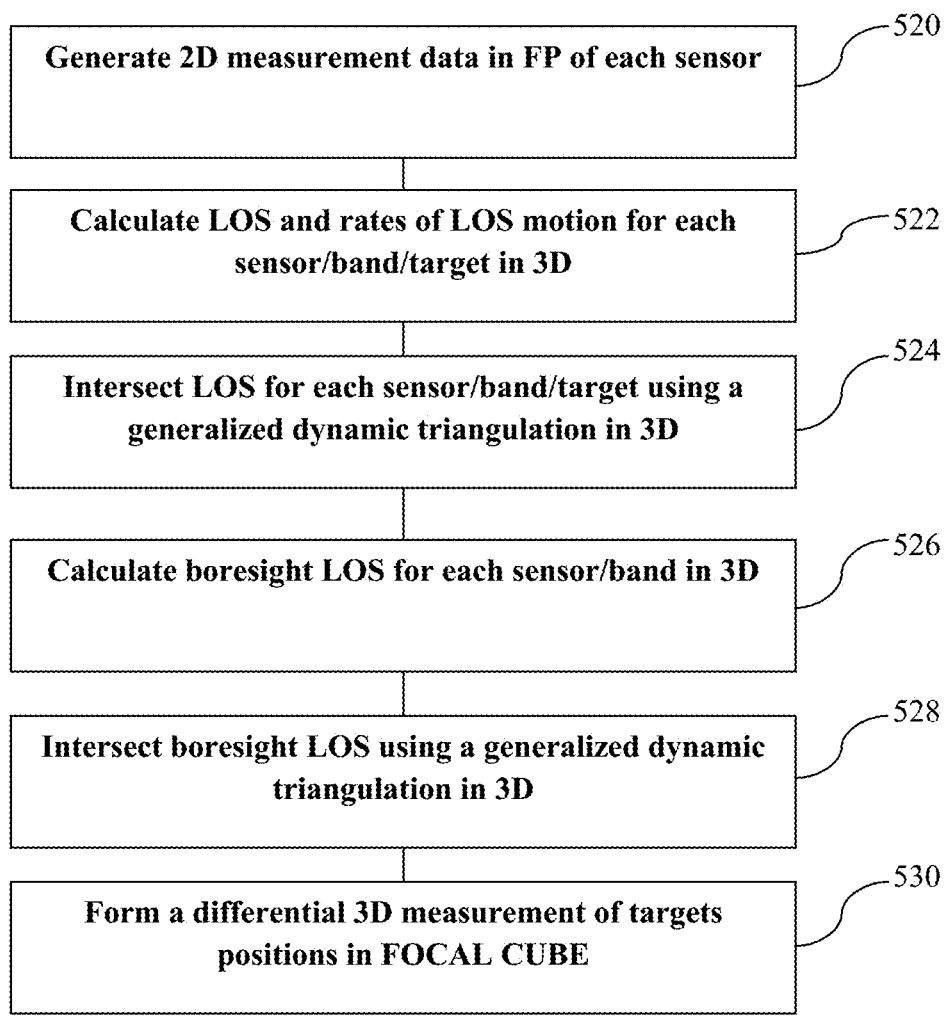
FIG. 5C is an exemplary process flow for generating a FOCAL CUBE, according to some embodiments of the disclosed invention.

FIG. 5C is an exemplary process flow for generating a FOCAL CUBE, according to some embodiments of the disclosed invention. In some embodiments, the FOCAL CUBE is constructed from the intersection of LOSs (e.g., targets, boresights) of any types (e.g., multiple sensors, multiple bands, multiple time points for stationary targets), when multiple targets are associated between sensors (e.g., based on target intensities and colors). As shown in block 520, the measurement data (e.g., both angular positions and angular rates) is received from multiple targets in two or more FPs, located at different sensors and including multiple FP for multiple wavebands and multiple time points (for stationary targets). In block 522, the LOSs and the rates of LOS motion are calculated for multiple target for each FP due to multiple sensors, multiple bands, and multiple time points for stationary targets.

In block 524, for each target, the two or more associated LOSs (for multiple sensors, multiple bands, and multiple time points for stationary targets) are intersected, for example, by using the generalized dynamic triangulation (as described in FIG. 5A), so that the intersection point has the minimum sum of distances to each LOS. As explained above, the closest intersection points for each target are the triangulated estimates of the targets positions and velocities in 3D. The boresight LOS (zero-pixel point in FP) and four shifted-boresight LOSs as well as the rates of LOS motion for each FP (due to multiple sensors, multiple bands, and multiple time points for stationary targets) are obtained in block 526. The boresight LOS for all sensors are intersected, for example, by using the closest approach, in block 528. The boresight intersection is accomplished by the same process as for each target (e.g., generalized dynamic triangulation as described in FIG. 5A). This intersection point, which defines the origin of FOCAL CUBE, is the position/velocity estimates of the boresight in 3D.

In block 530, a differential measurement of targets positions is formed as a difference of positions of targets closest points and positions of boresight closest point. Also a differential measurement of targets velocities is formed as a difference of velocities of targets closest points and velocities of boresight closest point. As a result, the local arrangement of targets as well as their local velocities in the constructed FOCAL CUBE are estimated without any effects of LOS biases and their rates.

This way, an unbiased local measurement space from any architecture of multiple LOSs is obtained, which is invariant to any common LOS biases and their rates. As explained above, this new unbiased measurement space is called FOCAL CUBE, where both local positions and velocities of multiple targets are measured in 3D with the pixel accuracy and without any effects from any common LOS biases and their rates. Also, the full potential of unbiased 2D FPs (at pixel level) is utilized by projecting them into an unbiased 3D FOCAL CUBE (at 3D-voxel resolution level equivalent to that of 2D pixel). Accordingly, the problem of locating multiple targets in an absolute 3D (ECI) is now effectively simplified into two main steps: 1) estimate positions/velocities of multiple targets in local FOCAL CUBE; and 2) estimate the absolute boresight LOS and its rate using, for example, stellar-inertial calibration process for each FP and thus the position/rate of 3D boresight for FOCAL CUBE. A simple addition (e.g., boresight-absolute+local), i.e. adding the local 3D estimates in the FOCAL CUBE to the calibrated 3D boresight of the FOCAL CUBE, provides the solution to the problem of estimating the absolute positions and velocities of multiple targets in 3D. In other words, the 3D arrangement of targets can be first estimated in the FOCAL CUBE and then located in the absolute space by using a single point, i.e., the 3D boresight.

Up to now for simplicity purpose, it was assumed that the multiple targets are already associated between multiple sensors. However, in practical cases, the data association of multiple targets needs to be solved for the FOCAL CUBE.

Figure 6A:
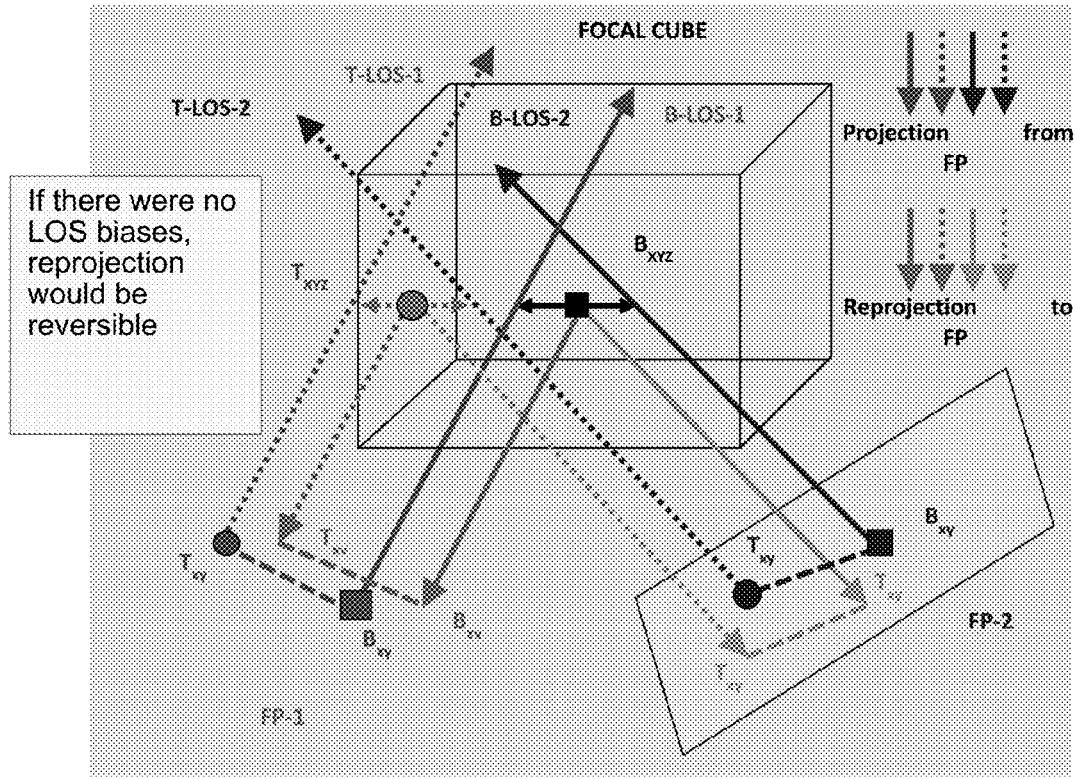
FIG. 6A depicts a target association in differential azimuth/elevation space of a FOCAL CUBE, according to some embodiments of the disclosed invention.
Figure 6B:
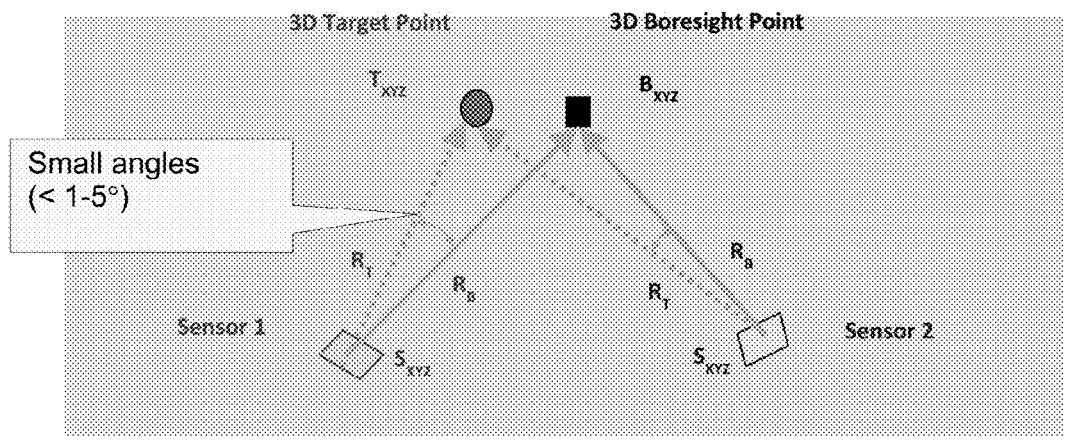
FIG. 6B illustrates a target association in differential range space of a FOCAL CUBE, according to some embodiments of the disclosed invention.

FIG. 6A depicts a target association in differential azimuth/elevation space of a FOCAL CUBE and FIG. 6B illustrates a target association in differential range space of a FOCAL CUBE, according to some embodiments of the disclosed invention. FIGS. 6A and 6B show a single candidate pair out of N×M candidates (where N is the number of targets observed by Sensor 1 and M is the number of targets observed by Sensor 2) to simplify the figures. A process to make a decision if an associated pair is "right" or "wrong" is described below. This process is performed for each candidate pair is the case of N×M candidates. Since FOCAL CUBE is unscented from LOS biases, the target association problem is simplified at each single time point. In fact, only small (compared to LOS biases) measurement noises can now affect the association performance. In FOCAL CUBE one can simply observe targets with 3D resolution similar to those from 2D FPs. For the stereo observation (two FPs) the target association problem is reduced to a simple check of whether a pair of the tracks (from each FP) makes the right association or not (i.e., "right pair" or "wrong pair"). Consequently, N×M pairs should be checked. This check provides the necessary condition for the right association but not sufficient. However, targets can be obscured by each other or different sets of targets can be observed in different FP (singles).

Figure 6C:
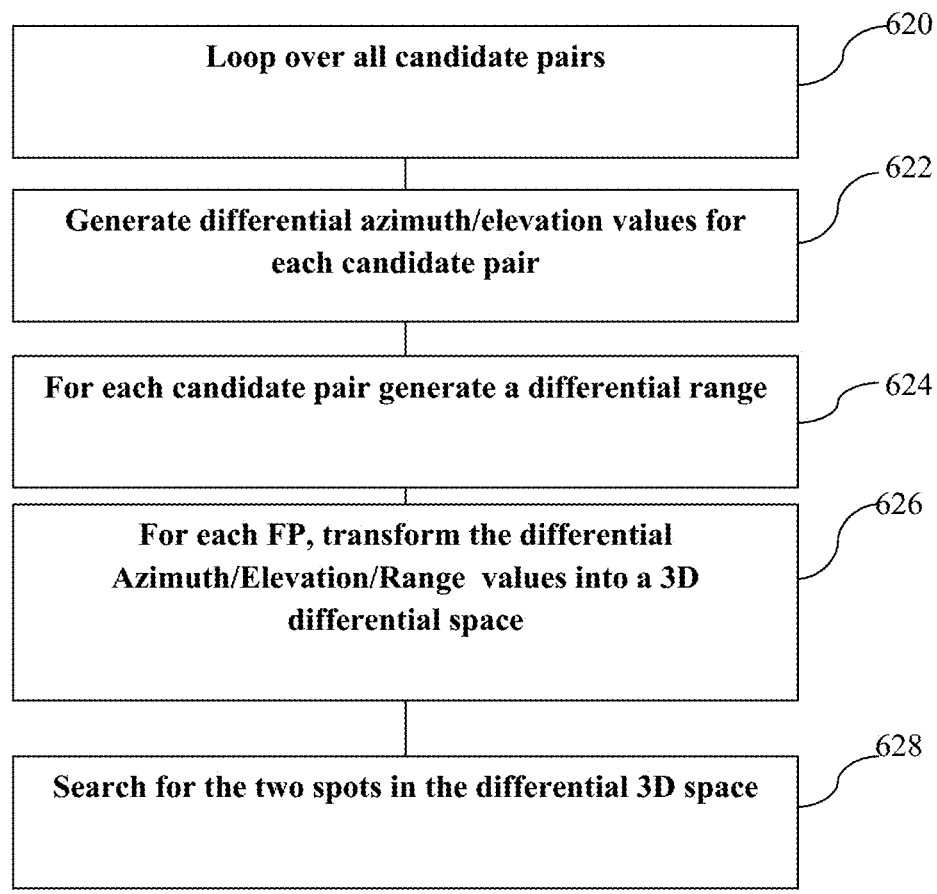
FIG. 6C is an exemplary process flow for target association in a FOCAL CUBE, according to some embodiments of the disclosed invention.

FIG. 6C is an exemplary process flow for target association in a FOCAL CUBE, according to some embodiments of the disclosed invention. That is, in the case of stereo observations, the check for the right/wrong associations is performed. As shown in block 620, the process according to the disclosed invention loops over all candidate pairs and repeats the same operations as shown in blocks 622, 624 and 626. In block 622, for each candidate pair (i and j indices in equation 5) corresponding to FP 1 and FP 2 (subscript indices 1 and 2 in equation 5), generate differential azimuth/elevation (AzEl) values using the original measurements and the boresight information (for example, as defined in FIG. 6B):

$$(AzEl)_1^{ij} = (T_{xy1}^{ij} - B_{xy1})_{meas} - (T_{xy1}^{ij} - B_{xy1})_{proj}$$

$$(AzEl)_2^{ij} = (T_{xy2}^{ij} - B_{xy2})_{meas} - (T_{xy2}^{ij} - B_{xy2})_{proj} \quad\quad 5$$

Here, the "meas" (measured) differential component is formed as a difference of the measured angular target position (T) and the angular boresight (B) position. Note that in both cases, the angular positions are expressed in the absolute LOS angles (azimuth/elevation), for example, by computing them from the relative pixel positions using a LOS reconstruction algorithm. The "proj" (projected) differential component is formed as follow. First, the closest point for the two candidate tracks (the point of closest intersection of the two LOS for a pair of candidate tracks) is projected back to both FP. Second, the closest point for the two boresights (the point of closest intersection of the two boresight LOS) is projected back to both FPs; and third, a difference between the two projections is taken to form the "proj" differential component.

In block 624, for each candidate pair (i and j) corresponding to FPs 1 and 2, a differential range R value is generated using the sensor positions and the closest point for the two candidate tracks (the point of closest intersection of two LOS for a pair of candidate tracks) and the 3D boresight information:

$$R_1^{ij} = R_{T_1}^{ij} - R_{B_2}^{ij} = \sqrt{\|S_{XYZ_1} - T_{XYZ}^{ij}\|} - \sqrt{\|S_{XYZ_1} - B_{XYZ}\|}$$

$$R_2{}^{ij} = R_{T_2}{}^{ij} - R_{B_2}{}^{ij} = \sqrt{\|S_{XYZ_2} - T_{XYZ}{}^{ij}\|} - \sqrt{\|S_{XYZ_2} - B_{XYZ}\|} \qquad 6$$

where, S is the sensor position (1 and 2) in ECI Cartesian coordinate system (XYZ); T is the XYZ position of the closest point for the two candidate tracks (the point of closest intersection of the two LOS for a pair of candidate tracks); and B is the XYZ position of the closest point for the two boresights (the point of closest intersection of the two boresights). The operation of root-square on the L-2 norm of the corresponding XYZ difference defines the corresponding range. The differential range R is defined as a simple differences of the two ranges for each FP1 or FP2.

In block 626, the differential Azimuth/Elevation/Range values are transformed for each FP-1 and FP-2 into a 3D differential space (FOCAL CUBE's voxels), via a rotation based on the reference values of the azimuth/elevation/ rotation angles:

$$(AzElR)_1{}^{ij} \rightarrow (XYZ)_1{}^{ij}$$

$$(AzElR)_2{}^{ij} \rightarrow (XYZ)_2{}^{ij} \qquad 7$$

Figure 7:
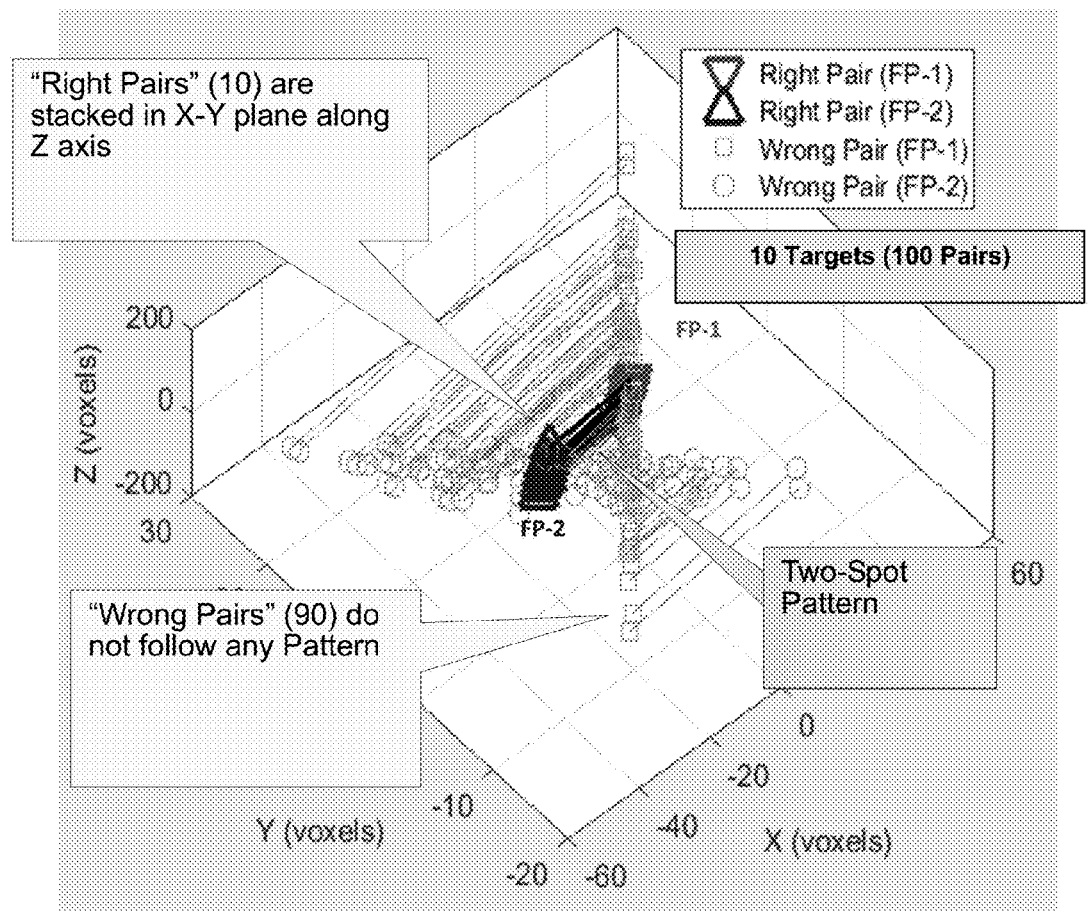
FIG. 7 shows a target association for a two-spot pattern in a FOCAL CUBE, according to some embodiments of the disclosed invention.

In block 628, a simple search is performed for the two spots in the differential 3D XYZ space, where the pairs (as 3D points) tend to group, as shown in FIG. 7. In particular, "right pairs" from both FPs (pairs which are associated with the same target) are densely stacked in the X-Y plane by Z axis, using a known two-spot pattern, where the size of the spot is defined of the size of the 3D voxel (comparable with the pixel-resolution of each FP). However, the "wrong pairs" from both FP (pairs which are not associated with the same target) do not make any patterns and are randomly distributed over all 3D space depending on the distance between the two actual targets the tracks are associated with.

In some embodiments, when the two sensors point to the same point, the two-spot pattern collapses to one-spot, around the origin of the FOCAL CUBE. This makes the problem of track association even easier, since all "right pairs" are stacked in one spot (the zero point) with the pixel-accuracy. It should be noted that one can apply the well-known "$\chi^2$ criterion" for each pair of tracks (i,j) to probabilistically associate "right pairs" and reject "wrong pairs". The term probabilistically entails that the position of each candidate pair in the local FOCAL CUBE is a Gaussian vector with the mean and covariance matrix. Consequently, a probability can be calculated for each decision if a pair is "right" or "wrong." This will provide a statistical mechanism to naturally treat unresolved and no-pair cases over time. The two-spot pattern can be formed also for velocities as an additional feature for association.

The above description considers a single time point (except for the case when the scene was stationary). A more general practical case when multiple moving targets are tracked over time and when the track associations are continuously improved (in the case of unresolved targets) is now explained. In principle, the generalization for multiple time points is straightforward by using recursive filtering (tracking). Below we list the new elements, which make it possible to bring the basic idea of FOCAL CUBE for the dynamic case and thus simplify the tracking problem.

In other words, for target association, each of target candidate pairs are analyzed to determine whether a target candidate pair constitutes a same target, differential azimuth/ elevation values for each target candidate pair are generated via a projection of the closest points for target candidate pairs and the boresight LOSs back into the focal planes of each target candidate pair, a differential range for each target candidate pair is generated via differencing the ranges to the closest points of said each target candidate pair and to the closest point of the boresight LOSs of said each target candidate pair, the differential azimuth/elevation values and the ranges are transformed into the unbiased 3D measurement space, and the unbiased 3D measurement space is searched for two locations in the unbiased 3D measurement space for associating the target candidate pairs. The size of the locations is defined by a sensor resolution in the unbiased 3D measurement space.

The above description considers a single time point. A more general practical case when multiple moving targets are tracked over time and when the track associations are continuously improved (in the case of unresolved targets) is now explained. In principle, the generalization for multiple time points uses recursive filtering (tracking). In some embodiments, the basic idea of FOCAL CUBE is also utilized for such dynamic cases and thus the tracking problem is further simplified.

Figure 8:
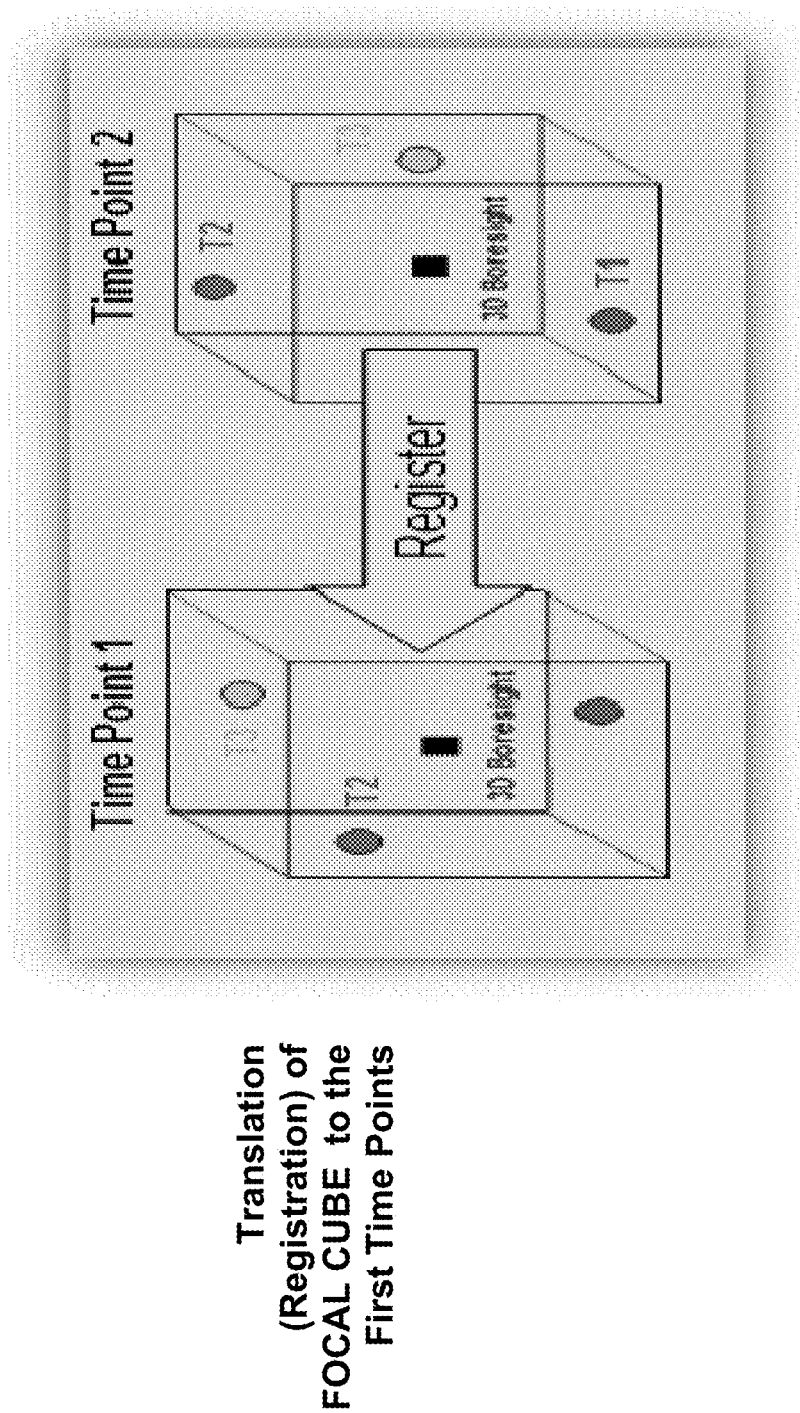
FIG. 8 schematically shows a translation a FOCAL CUBE to an unbiased measurement space over time, according to some embodiments of the disclosed invention.

FIG. 8 schematically shows a translation by a FOCAL CUBE to an unbiased measurement space over time to form an unbiased position-velocity measurement in a translated FOCAL CUBE, according to some embodiments of the disclosed invention. To turn a FOCAL CUBE into an unbiased measurement space over time, each FOCAL CUBE (at each time point) needs to be translated to a common 3D boresight point, as shown in FIG. 8. This can be the 3D boresight at the first time point. This translation is needed since the LOSs of the two (or more) sensors usually follow a moving cluster of targets so that the position of FOCAL CUBE changes in time. In some embodiments, the FOCAL CUBE translation can be carried out by shifting the 3D boresight point back in time according its recorded history, as shown. The recorded history is a history of the 3D point that is the closest intersection point of the two or more LOS corresponding to the 2D boresight points in each FP recorded by the boresight reconstruction algorithm.

Although FIG. 8 shows the element of translating FOCAL CUBE to the first time point which is needed for compensating LOS motion of the sensor with a narrow-field-of-view while it follows a target, this element is incorporated into a larger depiction of the recursive filtering (FIG. 9) where other elements are described.

In the unbiased measurement space, the measurements of targets' relative positions and velocities are obtained with respect to the origin of FOCAL CUBE. These measurements are generated by applying the closest approach (e.g., triangulation) for targets and boresight LOSs and then taking the difference between the closest points (as described above in reference to FIGS. 2, 3, 4 and 5). To estimate the [6×6] covariance matrix of the [6×1] measurement vector (3 positions and 3 velocities), the sensitivity analysis of the XYZ positions and velocities to the original azimuth/elevation measurements and their rates (in all focal planes) is applied. Here, the covariance matrix depends only on the characteristics of the measurement noise in each focal plane, not on the uncertainties in LOS biases (since the latter are isolated in the FOCAL CUBE). However, the small (compared to LOS biases) measurement errors that are caused by translation of FOCAL CUBEs over time may need to be considered as well. The source of these small errors is the drift in IMUs, which are used for generating LOS history while integrating measured angular rates.

The new approach makes it possible to track targets in 3D FOCAL-CUBE using physics-based equations (e.g., boosting missile or ballistic satellite). In other words, FOCAL CUBE is "undocked" from the absolute space (ECI) due to LOS biases but the physics-based 3D equations in ECI (boost-phase or ballistic) apply. This is possible since changes of the gravity field within position uncertainties due to LOS biases are small.

Figure 9:
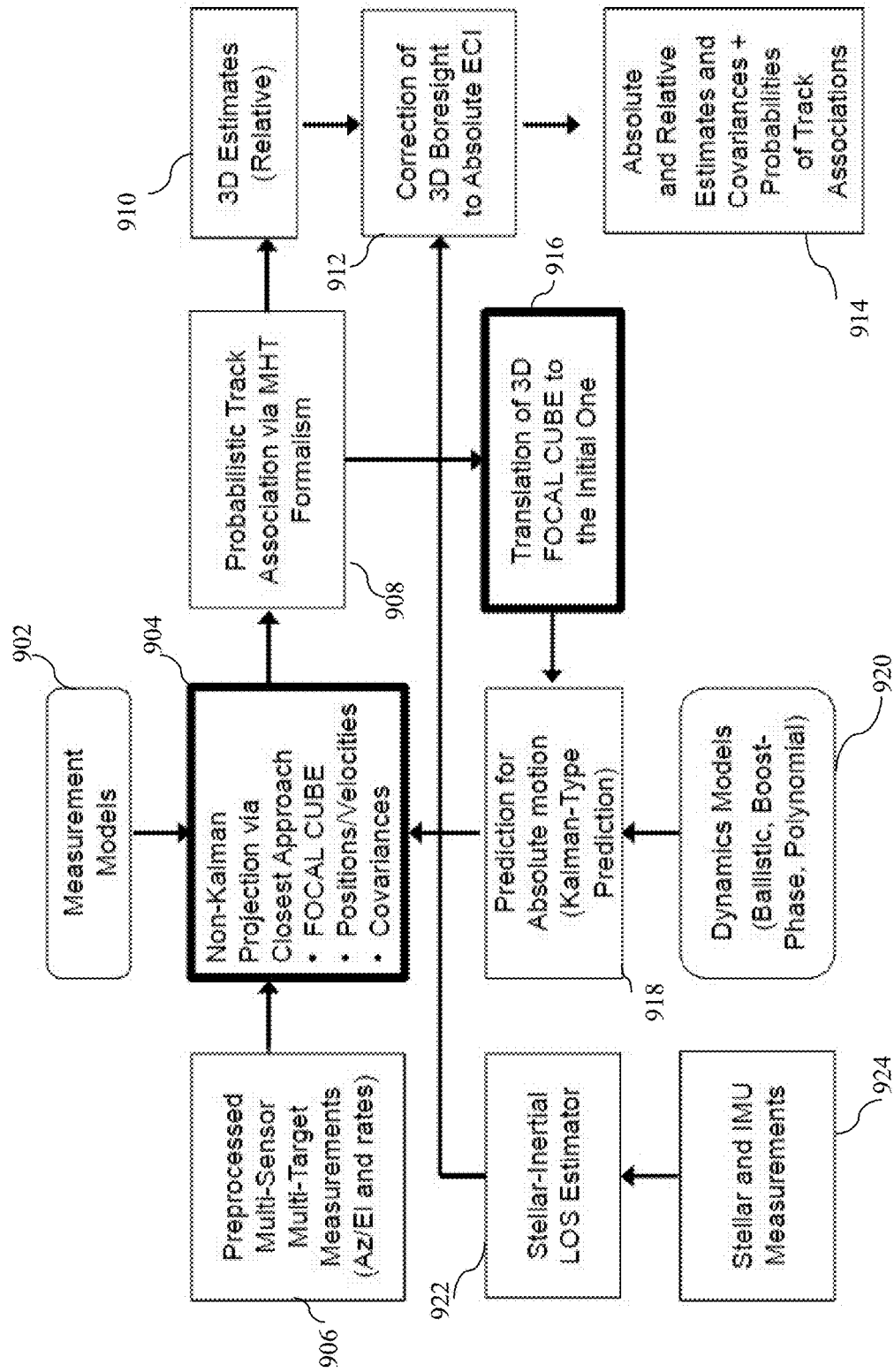
FIG. 9 depicts a recursive filtering over time, according to some embodiments of the disclosed invention.

FIG. 9 depicts a recursive filtering process over time, according to some embodiments of the disclosed invention. In the FOCAL CUBE recursive filtering over time (e.g., MHT framework) may be performed to further improve association and tracking accuracy.

The classic MHT tracker includes Kalman-type filter(s) for estimating states/covariances of targets' positions/velocities in the absolute space; and the Bayes algorithm for estimating the probabilities of association hypotheses. As shown in FIG. 9, the classic MHT filter for the absolute 3D estimates includes the blocks 902, 904 (in a conventional Kalman-filter implementation), 906, 908, 910 (for the absolute estimates rather than for the relative ones), 914 (just absolute estimates), 918, and 920. Block 904 is the central estimation block where a conventional Kalman-filter projection is used to process the preprocessed multi-sensor multi-target measurements (block 906) given the measurement models (block 902) for the LOS azimuth/elevation angles and their rates as a function of targets' positions and velocities.

Block 908 implements the MHT formalism to calculate the probabilities of each track association via the Bayesian formula, while in block 918 the Kalman-type prediction for absolute motion is performed using the targets' physics-based equations (block 920). In block 918, both the predicted estimates of targets' positions/velocities and associated covariance matrix are calculated. The blocks 904, 908, 918 with the associated inputs (blocks 902, 906, 920) are repeated recursively in time as new measurements are collected.

The disclosed invention introduces substantial modification to the classic MHT filter by decentralizing the filtering process into two steps: 1) estimation of relative targets' positions/velocities in the local FOCAL CUBE; and, 2) correction of the relative estimates to the absolute ones in ECI (block 912) via the stellar-inertial LOS calibration (blocks 922, 924). Note that other calibration procedures can be used, for example, based on radar or LADAR. This new decentralization approach involves a new element in block 904, which is a non-Kalman projection via the closest approach (used to build the FOCAL CUBE) rather than conventional Kalman projection. Also, block 916 translates 3D FOCAL CUBE to the FOCAL CUBE at the initial time point in order to enable measuring absolute (but shifted by 3D boresight) physics-based target motion. In short, the local unbiased 3D estimates of the position of the target are filtered recursively and in time to continue improving tracking accuracy and target association probabilities as new measurements of the target become available.

One of the advantages of using a new measurement space of the local FOCAL CUBE for MHT tracker is in the fact that the measurements (positions+velocities synthesized from the differential closest approach as described above) are completely independent of any type of LOS biases. That is why there is no need to use a large covariance matrix to jointly estimate the extended state-vector of all targets' positions/velocities and common LOS biases. Also, it is important that the targets' dynamical models can still be formulated in the absolute space as physics-based ones, even when FOCAL CUBE is undocked from the absolute space (due to biases). Moreover, the new measurement space (FOCAL CUBE) is constructed without any linearization of the non-linear measurement equations, as it is done in the case of the Kalman-filter. This dramatically increases the robustness of the specialized FOCAL CUBE estimate (new measurement) compared to the generic Kalman-type estimate in the ill-conditioned models (e.g., long ranges or small viewing angles).

In summary, the new MHT tracker shown in FIG. 9 is an effective solution to the 3D multi-sensor multi-target fusion customized to the specific requirements of this problem, rather than a generic Kalman-type solution. In particular, accounting for the problem's specifics (line of sight measurements to targets) makes it possible to build an unbiased measurement space (FOCAL CUBE), to eliminate a large covariance matrix to link the targets' positions/velocities with LOS biases and to avoid undesirable error-prone linearization of the non-linear measurement equations for LOS via a non-linear non-Kalman projection (differential closest approach).

Figure 10A:
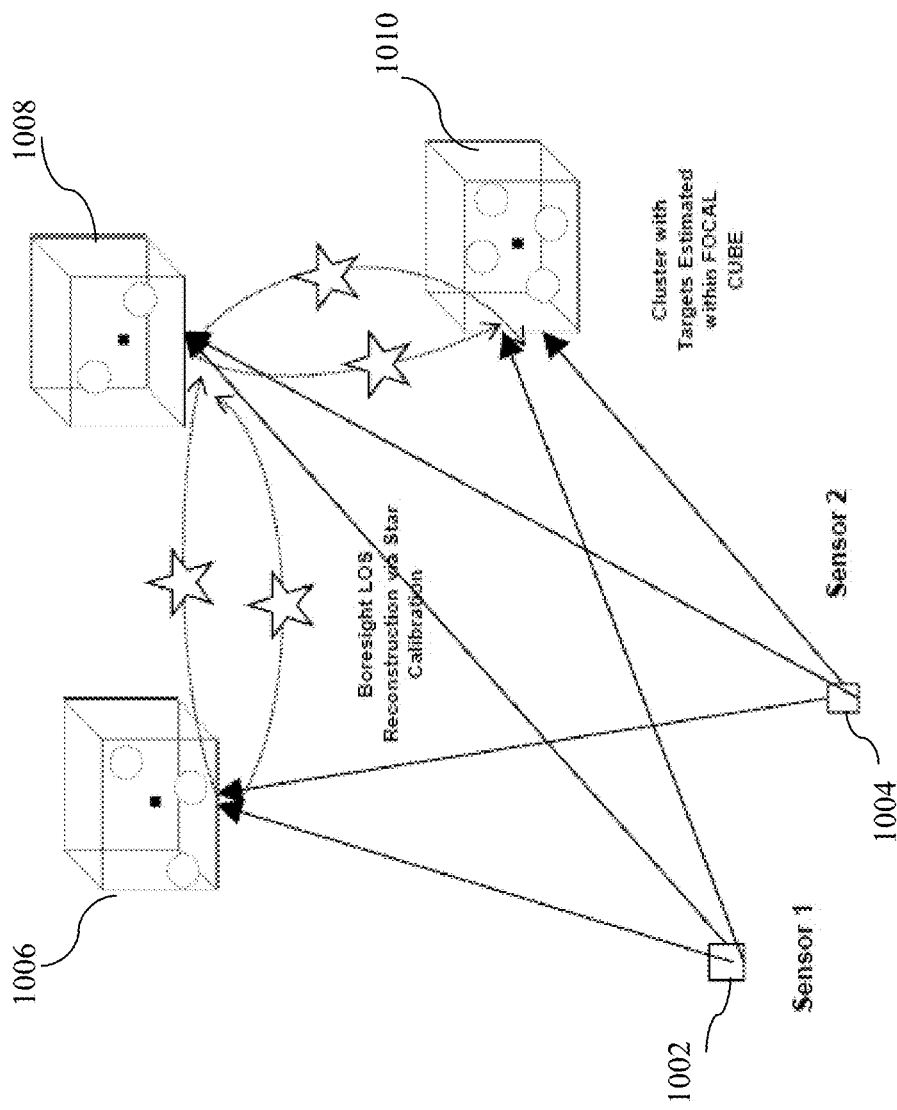
FIGS. 10A-10C show an example of resource allocation for multiple targets, according to some embodiments of the disclosed invention.
Figure 10B:
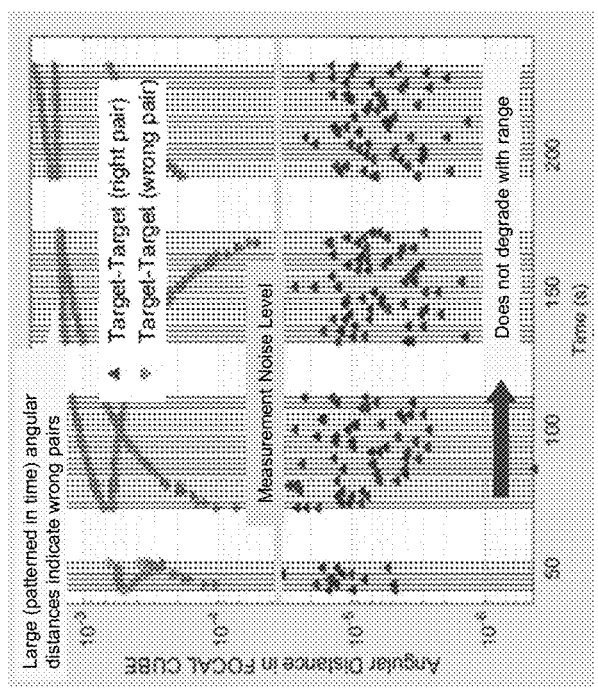
Figure 10C:
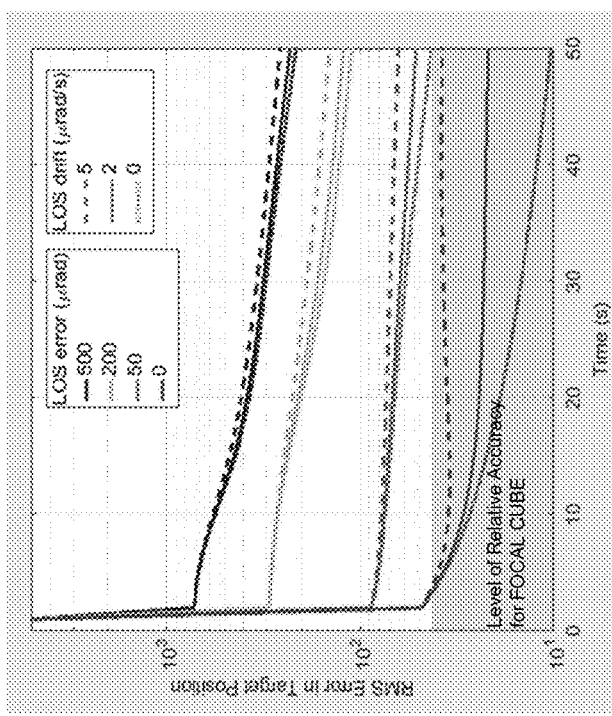

FIGS. 10A-10C show a challenging example of resource allocation for multiple targets, according to some embodiments of the disclosed invention. The challenge of this example is the fact that it is generally recognized that tracking massive missile raids with a narrow-field-of-view sensor is practically infeasible within the accuracy requirements. The new solution is based on synchronization in space and time of Sensor 1 (block 1002) and Sensor 2 (block 1004) while observing all targets in one cluster simultaneously. It assumed that targets in each cluster can be observed in the same focal plane of each sensor. The clusters of multiple targets (blocks 1006, 1008 and 1010) are then observed sequentially. The FOCAL CUBE approach is applied to each cluster of targets which allows for fast simple association and fast 3D tracker convergence in FOCAL CUBE.

FIG. 10B and FIG. 10C provide an assessment of the track association and 3D tracking performance, respectively. In FIG. 10B, at each time point, there are 9 candidate pairs (3 targets in each FP) for track association to choose from. The 9 pairs are all plotted indicating whether each pair is the "right" or "wrong" association. The "right" associations (pairs) are denoted by red triangle (up); the "wrong" association are denoted by orange triangle (down). As one can see from FIG. 10B, the new approach (target association in FOCAL CUBE) naturally (no global optimization) and instantaneously evaluates "right" and "wrong" target-pairs using the measurement noise threshold.

In FIG. 10C, a parametric study of 3D Tracker accuracy is performed using the 2 driving error sources: 1) initial LOS error; and 2) LOS drift. The case when the initial LOS error=0 corresponds to the case when tracking takes place in the FOCAL CUBE unscented from LOS biases (but with LOS drift as registration noise). As one can see from FIG. 10C, the new approach (tracking in FOCAL CUBE) demonstrates that it takes only few seconds to reduce the relative error to its steady-state level (the accuracy requirements). After all targets are associated/tracked within the first cluster (block 1006), the corresponding FOCAL CUBE stores all relative positions/velocities of targets.

Sensor 1 (block 1002) and Sensor 2 (1004) can then switch to another cluster of targets (block 1008). But, in doing so, the sensors can perform boresight LOS reconstruction via star calibration, therefore, locating the 3D boresight for the FOCAL CUBE in the absolute coordinate system (ECI). The process repeats from cluster to cluster. According to the disclosed invention, limited resources (2 sensors with narrow-field-of-view FP) can be effectively used for accurate association/tracking multiple missile raids within tens of seconds using the FOCAL CUBE solution for each cluster of targets and then a stellar-inertial boresight LOS estimation method to manage the absolute locations of FOCAL CUBEs.

As one skilled in the art would readily understand that the processes depicted in FIGS. 1-10 are performed by one or more processors, such as microprocessors or special purpose processors with associated circuitry including I/O, memory and control circuitries, as known in the art. In some embodiments, all or most of such processes are performed by a single processor at the sensor location, for example, in a ground, air or sea (stationary or moving) platform. In some embodiments, a first processor (for example, at the sensor location) performs the calculations of LOS from the target(s) and a second processor at a different location (for example, on the ground station) performs calculations of boresight LOS, intersecting the boresight Los and forming the FOCAL CUBE.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for determining positions of multiple simultaneously moving targets in an unbiased three dimensional (3D) measurement space using data collected against the multiple targets by a plurality of electro-optical or infrared (EO/IR) sensors, the method comprising:
    receiving data collected from electrical signals reflected from the multiple targets by the plurality of EO/IR sensors, wherein each of the plurality of EO/IR sensors includes a focal plane for a given waveband;
    receiving range data from a LADAR configured to point to only one of the multiple moving targets;
    determining focal planes of each of the plurality of EO/IR sensors;
    generating two dimensional (2D) measurement data for each of the multiple targets in the focal planes of each of the plurality of EO/IR sensors;
    calculating a line of sight (LOS) to each of the multiple targets for each of the plurality of EO/IR sensors;
    synchronizing the plurality of EO/IR sensors in space and time by:
        intersecting the calculated lines of sight for each of the plurality of EO/IR sensor and finding the closest intersection point in a 3D space;
        calculating a boresight line of sight in 3D for each of the plurality of EO/IR sensors;
        intersecting the boresight lines of sights for each of the plurality of EO/IR sensors;
        calculating the closest intersection point in the 3D space to define an origin for forming the unbiased 3D measurement space;
        generating the unbiased 3D measurement space from rates of LOS biases for each of the plurality of EO/IR sensors, as a virtual 3D sensor, wherein a size of the unbiased 3D measurement space is a function of ranges from the plurality of EO/IR sensors to the multiple targets; and
        calculating local unbiased 3D estimates of the positions of the multiple targets in the unbiased 3D measurement space as a difference between a closest point of each of the multiple targets LOS and a closest point of a respective boresight LOS, wherein the calculated local unbiased 3D estimates represent a local arrangement of the multiple targets;
    fusing the range data from the LADAR pointed to said only one of the multiple moving targets with the local unbiased 3D estimates of the positions of the multiple targets; and
    utilizing the fused range data with the local unbiased 3D estimates of the positions of the multiple targets to perform one or more of tracking the multiple targets, recognizing the multiple targets, and characterizing the multiple targets, wherein the method is performed by one or more processors.

2. The method of claim 1, wherein the plurality of EO/IR sensors are used to measure positions of each multiple targets at each point in time.

3. The method of claim 1, wherein at least one of the plurality of EO/IR sensors includes multiple focal planes for multiple wavebands, wherein the unbiased 3D measurement space is invariant to waveband misalignments in multiple focal planes and to waveband-dependent atmospheric refraction effects.

4. The method of claim 1, wherein a generalized dynamic triangulation method is used to estimate both positions and velocities of the closest points for the multiple targets and the boresight LOS to form the unbiased 3D measurement.

5. The method of claim 1, further comprising a plurality of target candidate pairs; and associating the plurality of target candidate pairs, wherein associating the plurality of target candidate pairs comprises:
    analyzing each of target candidate pairs to determine whether a target candidate pair constitutes a target,
    generating differential azimuth/elevation values for each target candidate pair via a projection of the closest points for target candidate pairs and boresight LOSs back into the focal planes of each target candidate pair,
    generating a differential range for each target candidate pair via differencing the ranges to the closest points of said each target candidate pair and to the closest point of the boresight LOSs of said each target candidate pair,
    transforming the differential azimuth/elevation values and the ranges into the unbiased 3D measurement space, and
    searching for two locations in the unbiased 3D measurement space for associating the target candidate pairs, wherein the size of the locations is defined by a sensor resolution in the unbiased 3D measurement space.

6. The method of claim 4, further comprising filtering the local unbiased 3D estimates of the positions of the multiple targets recursively and in time to continue improving tracking accuracy and target association probabilities as new measurements of the multiple targets become available.

7. The method of claim 6, wherein said filtering comprises:
    using the local unbiased 3D estimates of positions of the multiple targets and target velocity in the unbiased 3D measurement space to model target dynamics in the unbiased 3D measurement space;
    using a calibration technique to estimate 2D boresights of each EO/IR sensor and the 3D boresight of the unbiased 3D measurement space in the absolute coordinate system (ECI); and
    calculating the positions and velocities of the multiple targets in the absolute ECI system by adding the local unbiased 3D estimates of the positions of the multiple targets and the target velocity in the unbiased 3D measurement space to the 3D boresight of the unbiased 3D measurement space.

8. A system for determining positions of multiple simultaneously moving targets in an unbiased 3D measurement space using three dimensional (3D) fusion of sensor data collected against the multiple targets comprising:
a plurality of electro-optical or infrared (EO/IR) sensors, each including a focal plane for a given waveband, for generating two dimensional (2D) measurement data for each of the multiple targets in one or more focal planes of said each sensor;
a receiver for receiving data collected from electrical signals reflected from each of the multiple targets by the plurality of EO/IR sensors and range data from a LADAR configured to point to only one of the multiple moving targets;
a first processor for calculating a line of sight (LOS) to each of the multiple targets for each of the plurality of sensors; and
a second processor for synchronizing the plurality of EO/IR sensors in space and time by: intersecting the calculated line of sight for each of the plurality of EO/IR sensors and finding a closest intersection point in a 3D space in a 3D space, calculating a boresight line of sight in 3D for each of the plurality of sensors, intersection the boresight line of sights for each of the plurality of sensors and finding the closest intersection point, in the 3D space to define an origin for forming the unbiased 3D measurement space, generating the unbiased 3D measurement space from rates of LOS biases for each of the plurality of EO/IR sensors, as a virtual 3D sensor, wherein a size of the unbiased 3D measurement space is a function of ranges from the plurality of EO/IR sensors to the multiple targets, and calculating local unbiased 3D estimates of positions of the multiple targets in the unbiased 3D measurement space as a difference between a closest point of each of the multiple targets and a closest point of a respective boresight LOS, wherein the calculated local unbiased 3D estimates represent a local arrangement of the multiple targets, wherein the second processor fuses the range data from the LADAR pointed to said only one of the multiple moving targets with the local unbiased 3D estimates of the positions of the multiple targets and utilizes the fused range data with the local unbiased 3D estimates of the positions of the multiple targets to perform one or more of tracking the multiple targets, recognizing the multiple targets, and characterizing the multiple targets.

9. The system of claim 8, wherein the first processor and the second processor are the same processor.

10. The system of claim 8, wherein the first processor is located at proximity of at least one of the plurality of EO/IR sensors, and the second processor is located in a ground platform, an air platform or a sea platform.

11. The system of claim 8, wherein at least one of the plurality of EO/IR sensors includes multiple focal planes for multiple wavebands.

12. The system of claim 11, wherein the unbiased 3D measurement space is invariant to waveband misalignments in multiple focal planes and to waveband-dependent atmospheric refraction effects.

13. The system of claim 8, wherein a generalized dynamic triangulation method is used to estimate both positions and velocities of the closest points for the multiple targets and the boresight LOS to form the unbiased 3D measurement.

14. The system of claim 13, wherein the second processor filters the local unbiased 3D estimates of the positions of the multiple targets recursively and in time to continue improving tracking accuracy and target association probabilities as new measurements of the multiple targets become available.

15. A non-transitory storage medium for storing a set of instructions, the set of instructions when executed by one or more processors perform a method for determining positions of multiple simultaneously moving targets in an unbiased three dimensional (3D) measurement space using data collected against the multiple targets by a plurality of electro-optical or infrared (EO/IR) sensors, the method comprising:
receiving data collected from electrical signals reflected from the multiple targets by the plurality of EO/IR sensors, wherein each of the plurality of EO/IR sensors includes a focal plane for a given waveband;
receiving range data from a LADAR configured to point to only one of the multiple moving targets;
determining focal planes of each of the plurality of EO/IR sensors;
generating two dimensional (2D) measurement data for each of the multiple targets in the focal planes of each of the plurality of EO/IR sensors;
calculating a line of sight (LOS) to each of the multiple targets for each of the plurality of EO/IR sensors;
synchronizing the plurality of EO/IR sensors in space and time by:
intersecting the calculated lines of sight for each of the plurality of EO/IR sensor and finding the closest intersection point in a 3D space;
calculating a boresight line of sight in 3D for each of the plurality of EO/IR sensors;
intersecting the boresight lines of sights for each of the plurality of EO/IR sensors;
calculating the closest intersection point in the 3D space to define an origin for forming the unbiased 3D measurement space;
generating the unbiased 3D measurement space from rates of LOS biases for each of the plurality of EO/IR sensors, as a virtual 3D sensor, wherein a size of the unbiased 3D measurement space is a function of ranges from the plurality of EO/IR sensors to the multiple targets; and
calculating local unbiased 3D estimates of the positions of the multiple targets in the unbiased 3D measurement space as a difference between a closest point of each of the multiple targets LOS and a closest point of a respective boresight LOS, wherein the calculated local unbiased 3D estimates represent a local arrangement of the multiple targets;
fusing the range data from the LADAR pointed to said only one of the multiple moving targets with the local unbiased 3D estimates of the positions of the multiple targets; and
utilizing the fused range data with the local unbiased 3D estimates of the positions of the multiple targets to perform one or more of tracking the multiple targets, recognizing the multiple targets, and characterizing the multiple targets, wherein the method is performed by one or more processors.

* * * * *